United States Patent
Gotoh et al.

(10) Patent No.: US 7,095,586 B2
(45) Date of Patent: *Aug. 22, 2006

(54) SOFT MAGNETIC FILM HAVING SATURATION MAGNETIC FLUX DENSITY BS OF AT LEAST 2.0 T AND MAGNETIC HEAD INCLUDING THE SAME

(75) Inventors: Mitsuhiro Gotoh, Niigata-ken (JP); Yoshihiro Kanada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 263 days.

This patent is subject to a terminal disclaimer.

(21) Appl. No.: 10/183,199

(22) Filed: Jun. 27, 2002

(65) Prior Publication Data

US 2003/0147176 A1 Aug. 7, 2003

(30) Foreign Application Priority Data

Jan. 15, 2002 (JP) ............................. 2002-005914

(51) Int. Cl.
*G11B 5/127* (2006.01)

(52) U.S. Cl. ......................................................... 360/126

(58) Field of Classification Search .................. 360/120, 360/121, 122, 123, 125, 126
See application file for complete search history.

(56) References Cited

U.S. PATENT DOCUMENTS 6,118,628 A 9/2000 Sano et al.
6,282,056 B1 * 8/2001 Feng et al. ............... 360/126
6,760,189 B1 7/2004 Gotoh et al.

FOREIGN PATENT DOCUMENTS

| EP | 234879 A1 * | 9/1987 |
|---|---|---|
| JP | 55-164092 | 12/1980 |
| JP | 01223611 A * | 9/1989 |
| JP | 05029172 A * | 2/1993 |
| JP | 05190327 A * | 7/1993 |
| JP | 5-255886 | 10/1993 |
| JP | 06162432 A * | 6/1994 |
| JP | 3009051 | 1/1995 |
| JP | 7-66035 | 3/1995 |
| JP | 7-192920 | 7/1995 |
| JP | 8-232081 | 9/1996 |
| JP | 2000-208355 | 7/2000 |
| JP | 3102505 | 8/2000 |
| JP | 2000-285411 | 10/2000 |
| JP | 2001-6931 | 1/2001 |

* cited by examiner

*Primary Examiner*—William J Klimowicz
(74) *Attorney, Agent, or Firm*—Brinks Hofer Gilson & Lione

(57) ABSTRACT

A soft magnetic film comprising an FeCo alloy containing noble metals such as Pr and Rh. This soft magnetic film has a saturation magnetic flux density Bs of at least 2.0 and high corrosion resistance. This soft magnetic film may be included in a thin-film magnetic head. A lower magnetic pole layer or an upper magnetic pole layer of the thin-film magnetic head has a composition represented by the formula $Fe_XCo_Y\alpha_Z$, wherein $\alpha$ is at least one element selected from the group consisting of Pd, Pt, Ru, and Ir, and wherein the ratio X/Y by mass percent of Fe to Co is in the range of 2 to 5, the $\alpha$ content Z is in the range of 0.5 to 18 mass percent, and X+Y+Z=100 mass percent.

18 Claims, 10 Drawing Sheets

SOFT MAGNETIC FILM HAVING SATURATION MAGNETIC FLUX DENSITY BS OF AT LEAST 2.0 T AND MAGNETIC HEAD INCLUDING THE SAME

This application claims the benefit of priority to Japanese Patent Application No. 2002-005914, filed Jan. 15, 2002.

BACKGROUND OF THE INVENTION

1. Field of the Invention

The present invention relates to soft magnetic films used as the core materials of thin-film magnetic heads. In particular, the present invention relates to a soft magnetic film which is composed of an FeCoα alloy, wherein α represents a noble metal, particularly FeCoRh, which has a saturation magnetic flux density Bs of at least 2.0 T, and which exhibits high corrosion resistance. Also, the present invention relates to a thin-film magnetic head including the soft magnetic film, a method for making the soft magnetic film, and a method for making the thin-film magnetic head.

2. Description of the Related Art

In order to achieve higher-density recording, for example, a magnetic material having a high saturation magnetic flux density Bs must be used as a core layer of a thin-film magnetic head to increase the recording density by the concentration of the magnetic flux in the vicinity of the gap of the core layer.

A traditionally used magnetic material is an NiFe alloy. The NiFe alloy film is formed by electroplating using a continuous DC, and exhibits a saturation magnetic flux density Bs of about 1.8 T.

However, the higher-density recording anticipated in the future requires a soft magnetic film having a higher saturation magnetic flux density Bs then the NiFe alloy can satisfactorily provide.

Another soft magnetic material often used, other than the NiFe alloy, is an FeCo alloy. An FeCo alloy film having an optimized composition has a higher saturation magnetic flux density Bs than that of the NiFe alloy film. However, it also has the following problem.

In some configurations of thin-film magnetic heads and other magnetic elements, an NiFe alloy film is disposed on the FeCo alloy film, which is formed by electroplating. Alternatively, FeCo alloy films are deposited on two faces of a nonmagnetic layer such as a gap layer, which is formed by plating. Unfortunately, these FeCo alloy films are often dissolved or corroded by ionization during the electroplating process.

It is likely that a large potential difference (standard electrode potential-difference), which is generated between the FeCo alloy film and the NiFe alloy film, or between the FeCo alloy film and the nonmagnetic layer, has a galvanic effect that dissolves the FeCo alloy film.

In a single FeCo alloy film configuration, this film must have a high corrosion resistance during the manufacturing processes of thin-film magnetic heads and other magnetic elements. For example, the film must have high corrosion resistance during the milling steps of sliders and the cleaning steps of the elements. Also, the film must have high corrosion resistance in the actual operating environments of thin-film magnetic heads.

Accordingly, soft magnetic films used in core layers of thin film magnetic heads must have both a high saturation magnetic flux density Bs and a high corrosion resistance.

SUMMARY OF THE INVENTION

An object of the present invention is to provide a soft magnetic film comprising an FeCo alloy which contains a noble metal such as Pd or Rh, which has a saturation magnetic flux density Bs of at least 2.0 T, and which has a high corrosion resistance.

Another object of the present invention is to provide a thin-film magnetic head including the soft magnetic film, a method for making the soft magnetic film, and a method for making the thin-film magnetic head.

A soft magnetic film according to the present invention has a composition formed by plating and represented by the formula $Fe_XCo_Y\alpha_Z$, wherein α is at least one element selected from the group consisting of Pd, Pt, Ru, and Ir, the ratio X/Y by mass percent of Fe to Co is in the range of 2 to 5, the α content Z is in the range of 0.5 to 18 mass percent, and X+Y+Z=100 mass percent.

The element α is added to enhance corrosion resistance. At an α content of less than 0.5 mass percent, the corrosion resistance is not enhanced. At an α content exceeding 18 mass percent, the saturation magnetic flux density Bs does not reach 2.0 T due to a decreased Fe content in the composition.

When the ratio X/Y by mass percent of Fe to Co is in the range of 2 to 5, a saturation magnetic flux density Bs of at least 2.0 T is achieved, as demonstrated by the experimental results described below.

The above soft magnetic film has a saturation magnetic flux density Bs of at least 2.0 T and exhibits higher corrosion resistance than that of an FeCo alloy not containing the element α.

Preferably, the ratio X/Y by mass percent of Fe to Co is in the range of 2.6 to 4.3, and the α content Z is in the range of 3 to 9 mass percent.

A soft magnetic film having such a preferable composition has a saturation magnetic flux density Bs of at least 2.2 T, and exhibits higher corrosion resistance than that of an FeCo alloy not containing the element α.

Preferably, the soft magnetic film has a composition represented by the formula $Fe_XCo_Y\alpha_Z\beta_V$, wherein β is at least one of Ni and Cr, the ratio X/Y by mass percent of Fe to Co is in the range of 2 to 5 and more preferably in the range of 2.6 to 4.3, the α content Z is in the range of 0.5 to 18 mass percent and more preferably in the range of 3 to 9 mass percent, the β content V is in the range of 0.5 to 5 mass percent, and X+Y+Z+V=100 mass percent.

A soft magnetic film having such a composition has a saturation magnetic flux density Bs of at least 2.0 T or at least 2.2 T under optimized conditions, and exhibits higher corrosion resistance. The element β contributes to higher corrosion resistance due to the formation of a passivation film. When the element β is Ni, the film stress is decreased.

According to a second aspect of the present invention, a soft magnetic film has a composition formed by plating and represented by the formula $Fe_XCo_YRh_W$, wherein the Fe content X is 56 mass percent or more, the Co content Y is 20 mass percent or more, the Rh content W is in the range of 1.7 to 20 mass percent, and X+Y+W=100 mass percent.

At an Rh content of less than 1.7 mass percent, the corrosion resistance is not enhanced. At an Rh content exceeding 20 mass percent, the saturation magnetic flux density Bs does not reach 2.1 T due to a decreased Fe content in the composition.

Preferably, the Rh content W is 7.5 percent by weight or more. Corrosion resistance comparable with that of an NiFe alloy used in conventional core materials is achieved, as demonstrated by the experimental results described below.

Preferably, the ratio X/Y by mass percent of Fe to Co is in the range of 2.030 to 2.704, and the Rh content W is in the range of 7.5 to 10 mass percent. This achieves a saturation magnetic flux density Bs of at least 2.2 T and corrosion resistance comparable with that of the NiFe alloy used in conventional core materials.

Preferably, the soft magnetic film according to the present invention further comprises an element β, wherein β is at least one of Ni and Cr. The composition thereby is represented by the formula $Fe_XCo_YRh_W\beta_V$, wherein the Fe content X is 56 mass percent or more, the Co content Y is 20 mass percent or more, the Rh content W is in the range of 1.7 to 20 mass percent, and more preferably 7.5 to 20 mass percent, and X+Y+W+V=100 mass percent. More preferably, the ratio X/Y by mass percent of Fe to Co is in the range of 2.030 to 2.704, the Rh content W is in the range of 7.5 to 10 mass percent, and the β content V is in the range of 0.5 to 5 mass percent.

The soft magnetic film within such a range has a saturation magnetic flux density Bs of at least 2.1 T under optimized conditions and high corrosion resistance. The element β contributes to higher corrosion resistance due to the formation of a passivation film. When the element β is Ni, the film stress is decreased.

In the present invention, the soft magnetic film may be overlaid with an NiFe alloy film that is formed by plating. Thus, the resulting soft magnetic film is referred to as a composite soft magnetic film.

The noble metal elements α and Rh are barely ionized alone. In the electroplating process of an NiFe alloy film on a soft magnetic film containing the noble metal, the FeCoα and FeCoRh alloys are prevented from dissolution by ionization. In FeCoαβ and FeCoRhβ alloys, a passivation film formed on the surface more effectively prevents the dissolution of the alloy by ionization.

In conclusion, the FeCoα, FeCoαβ, FeCoRh, or FeCoRhβ alloy film, and the composite soft magnetic film of this alloy film and an NiFe alloy film, have a high saturation magnetic flux density Bs and high corrosion resistance.

One of the upper face and the lower face of the soft magnetic film may be covered with a nonmagnetic film formed by plating.

According to another aspect of the present invention, a thin-film magnetic head comprises: a magnetic lower core layer, an upper core layer formed on the magnetic lower core layer with a magnetic gap provided therebetween, a coil layer for applying a recording magnetic field to the lower core layer and the upper core layer, wherein at least one of the lower core layer and the upper core layer comprises the above-mentioned soft magnetic film.

Preferably, the thin-film magnetic head further comprises a lower magnetic pole layer on the lower core layer and at a face opposing a recording medium, wherein the lower magnetic pole layer comprises the soft magnetic film.

According to another aspect of the present invention, a thin-film magnetic head comprises: a lower core layer; an upper core layer; and a magnetic pole unit between the lower core layer and the upper core layer, the width of the magnetic pole unit being shorter than that of the lower core layer and the upper core layer in the track width direction, the magnetic pole unit comprising: a lower magnetic pole layer in contact with the lower core layer; an upper magnetic pole layer in contact with the upper core layer; and a gap layer lying between the lower magnetic pole layer and the upper magnetic pole layer, or may comprise an upper magnetic pole layer in contact with the upper core layer and a gap layer lying between the upper magnetic pole layer and the lower core layer, wherein at least one of the upper magnetic pole layer and the lower magnetic pole layer comprises the above-described soft magnetic film.

Preferably, the upper magnetic pole layer comprises the soft magnetic film and the upper core layer comprises an NiFe alloy film formed by plating.

Preferably, at least one of the upper core layer and the lower core layer includes at least two magnetic sublayers at a portion adjacent to the gap layer, or one of the lower magnetic pole layer and the upper magnetic pole layer includes at least two magnetic sublayers, the magnetic sublayer in contact with the gap layer comprising the soft magnetic film.

Preferably, the magnetic sublayer not in contact with the gap layer is formed by plating an NiFe alloy.

As described above, the use of FeCoα, FeCoαβ, FeCoRh, and FeCoRhβ alloys as soft magnetic films according to the present invention have a high saturation magnetic flux density BS of at least 2.0 T and high corrosion resistance. Thus, a thin-film magnetic head including a core layer composed of such a soft magnetic film concentrates the magnetic flux in the vicinity of the gap and is suitable for higher-density recording. The thin-film magnetic head also has higher corrosion resistance.

A method for making a soft magnetic film according to the present invention comprises electroplating an $Fe_XCo_Y\alpha_Z$ alloy film, wherein α is at least one element selected from the group consisting of Pd, Pt, Ru, and Ir, the ratio X/Y by mass percent of Fe to Co is in the range of 2 to 5, the α content Z is in the range of 0.5 to 18 mass percent, and X+Y+Z=100 mass percent. A soft magnetic film obtained by this method has a saturation magnetic flux density Bs of at least 2.0 T, and higher corrosion resistance than that of an α-free FeCo alloy.

Preferably, the $Fe_XCo_Y\alpha_Z$ alloy film produced by electroplating satisfies the conditions that the ratio X/Y by mass percent of Fe to Co is in the range of 2.6 to 4.3, the α content Z is in the range of 3 to 9 mass percent, and X+Y+Z=100 mass percent. A soft magnetic film obtained by this method has a saturation magnetic flux density Bs of at least 2.2 T and higher corrosion resistance than that of an α-free FeCo alloy.

Preferably, the $Fe_XCo_Y\alpha_Z$ alloy film is electroplated in a plating bath in which the Fe ion concentration is in the range of 1.2 to 3.2 g/liter, the Co ion concentration is in the range of 0.86 to 1.6 g/liter, and the α ion concentration is in the range of 0.2 to 6 mg/liter.

By controlling these ion concentrations; the ratio X/Y of Fe to Co can be set within the range of 2 to 5 and preferably 2.6 to 4.3, and the α content Z can be set within the range of 0.5 to 18 mass percent and preferably 3 to 9 mass percent in the plated $Fe_XCo_Y\alpha_Z$ alloy.

Preferably, the soft magnetic film further comprises an element β, wherein β is at least one of Ni and Cr, the composition thereby being represented by the formula $Fe_XCo_Y\alpha_Z\beta_V$, wherein the β content V is in the range of 0.5 to 5 mass percent and X+Y+Z+V=100 mass percent.

Alternatively, a method for making a soft magnetic film according to the present invention comprises electroplating an $Fe_XCo_YRh_W$ alloy film, wherein the Fe content X is 56 mass percent or more, the Co content Y is 20 mass percent or more, the Rh content W is in the range of 1.7 to 20 mass percent, and X+Y+W=100 mass percent.

Preferably, the Rh content W is 7.5 mass percent or more.

Preferably, the ratio X/Y by mass percent of X to Co is in the range of 2.030 to 2.704 and the Rh content W is in the range of 7.5 to 10 mass percent.

Preferably, the $Fe_XCo_YRh_W$ alloy film is electroplated in a plating bath in which the Fe ion concentration is in the range of 1.0 to 5.0 g/liter, the Co ion concentration is in the range of 0.1 to 5.0 g/liter, and the Rh ion concentration is in the range of 1.0 to 10.0 mg/liter.

Preferably, the soft magnetic film further comprises an element β wherein β is at least one of Ni and Cr, the composition thereby being represented by the formula $Fe_XCo_Y\alpha_Z\beta_V$, wherein the β content V is in the range of 0.5 to 5 mass percent and X+Y+W+V=100 mass percent.

In the present invention, the electroplating is preferably performed using a pulsed current. In particular, the FeCoα alloy layer and the FeCoRh alloy layer are preferably formed by electroplating using a pulsed current. In electroplating using a pulsed current, an operation time for energizing the system and a dead time for suspending the energizing are repeated during the plating process by, for example, an ON/OFF switching operation using a current control element. By introducing the dead time, the FeCoα alloy film and the FeCoRh alloy film are gradually deposited during the plating process, and the current density in the system becomes more uniform as compared with plating by a continuous DC. In this method, the Fe content in the soft magnetic film can be readily controlled and increased as compared with an electroplating process using a DC.

Preferably, the plating bath further contains sodium saccharine. Sodium saccharine functions as a stress relaxant to decrease the film stress of the plated FeCoα, FeCoαβ, FeCoRh, or FeCoRhβ alloy.

Alternatively, the plating bath composition for forming the FeCoα or FeCoαβ alloy may contain 2-butyne-1,4-diol. This compound suppresses the coarsening of the crystal grains in the plated alloy. As a result, voids between crystal grains decrease and the film has a smoother surface, thereby resulting in a decreased coercive force Hc of the alloy.

Alternatively, the plating bath composition may contain sodium 2-ethylhexyl sulfate. Sodium 2-ethylhexyl sulfate, being a surfactant, removes hydrogen, which is generated during the plating process for forming the alloy. Thus, this compound prevents the formation of a rough surface, which is caused by hydrogen trapped on the plated film.

Sodium 2-ethylhexyl sulfate may be replaced with sodium laurylsulfate. However, bubbling readily occurs in the plating bath containing sodium laurylsulfate as compared with the plating bath containing sodium 2-ethylhexyl sulfate. Thus, it is difficult to determine the content of sodium laurylsulfate not causing bubbling. Accordingly, sodium 2-ethylhexyl sulfate, which barely causes bubbling, is preferably added in an amount that can effectively remove hydrogen.

In a method according to the present invention for making a thin-film magnetic head comprising a magnetic lower core layer, an upper core layer formed on the magnetic lower core layer with a magnetic gap provided therebetween, a coil layer for applying a recording magnetic field to the lower core layer and the upper core layer, at least one of the lower core layer and the upper core layer comprising a soft magnetic film, the method is characterized in that the soft magnetic film is formed by the above-described method.

Preferably, a lower magnetic pole layer is formed on the lower core layer at a face opposing a recording medium by plating so as to protrude on the lower core layer, and the lower magnetic pole layer comprises the soft magnetic film.

In a method according to the present invention for making a thin-film magnetic head having a lower core layer, an upper core layer, and a magnetic pole unit provided between the lower core layer and the upper core layer, the length of the magnetic pole unit being shorter than that of the lower core layer and the upper core layer in the track width direction, the magnetic pole unit including a lower magnetic pole layer in contact with the lower core layer, an upper magnetic pole layer in contact with the upper core layer, and a gap layer lying between the lower magnetic pole layer and the upper magnetic pole layer, or including an upper magnetic pole layer in contact with the upper core layer and a gap layer lying between the upper magnetic pole layer and the lower core layer, the method comprises forming at least one of the upper magnetic pole layer and the lower magnetic pole layer by the above-described method, and at least one of the upper magnetic pole layer and the lower magnetic pole layer thereby comprising the soft magnetic film.

Preferably, the upper magnetic pole layer comprises the soft magnetic film, and the upper core layer is formed on the upper magnetic pole layer by electroplating an NiFe alloy.

Preferably, at least one of the upper core layer and the lower core layer includes at least two sublayers at a portion adjacent to the magnetic gap, or one of the upper magnetic pole layer and the lower magnetic pole layer includes at least two magnetic sublayers, the magnetic sublayer in contact with the magnetic gap comprising the soft magnetic film.

Preferably, the magnetic sublayer that is not in contact with the magnetic gap is formed by plating an NiFe alloy.

The soft magnetic film which is formed by electroplating an FeCoα alloy or an FeCoαβ alloy has a composition $Fe_XCo_Y\alpha_Z$ wherein α is at least one element selected from the group consisting of Pd, Pt, Ru, and Ir, the ratio X/Y by mass percent of Fe to Co is in the range of 2 to 5 and preferably 2.6 to 4.3, the α content Z is in the range of 0.5 to 18 mass percent and preferably 3 to 9 mass percent, and X+Y+Z=100 mass percent, or a composition $Fe_XCo_Y\alpha_Z\beta_V$ wherein β is at least one of Ni and Cr, the ratio X/Y by mass percent of Fe to Co is in the range of 2 to 5 and more preferably in the range of 2.6 to 4.3, the α content Z is in the range of 0.5 to 18 mass percent and more preferably in the range of 3 to 9 mass percent, the β content V is in the range of 0.5 to 5 mass percent, and X+Y+Z+V=100 mass percent.

The soft magnetic film which is formed by electroplating an FeCoRh alloy or an FeCoRhβ alloy has a composition $Fe_XCo_YRh_W$, wherein the Fe content X is 56 mass percent or more, the Co content Y is 20 mass percent or more, the Rh content W is in the range of 1.7 to 20 mass percent, and preferably 7.5 mass percent or more, the ratio X/Y by mass percent of Fe to Co is more preferably in the range of 2.030 to 2.704, the Rh content W is in the range of 7.5 to 20 mass percent, and the β content V is in the range of 0.5 to 5 mass percent.

A thin-film magnetic head including a core layer composed of such a soft magnetic film can be readily produced with high yield. The resulting thin-film magnetic head has a high saturation magnetic flux density Bs, which is suitable for high-recording density, and has higher corrosion resistance as compared with an FeCo alloy not containing the elements α and Rh.

DESCRIPTION OF THE PREFERRED EMBODIMENTS

Figure 1:
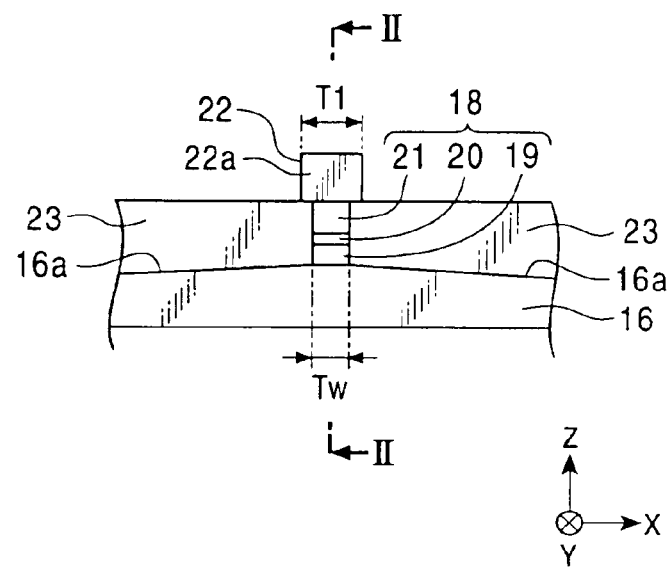
FIG. 1 is a partial front view of a thin-film magnetic head according to a first embodiment of the present invention.
Figure 2:
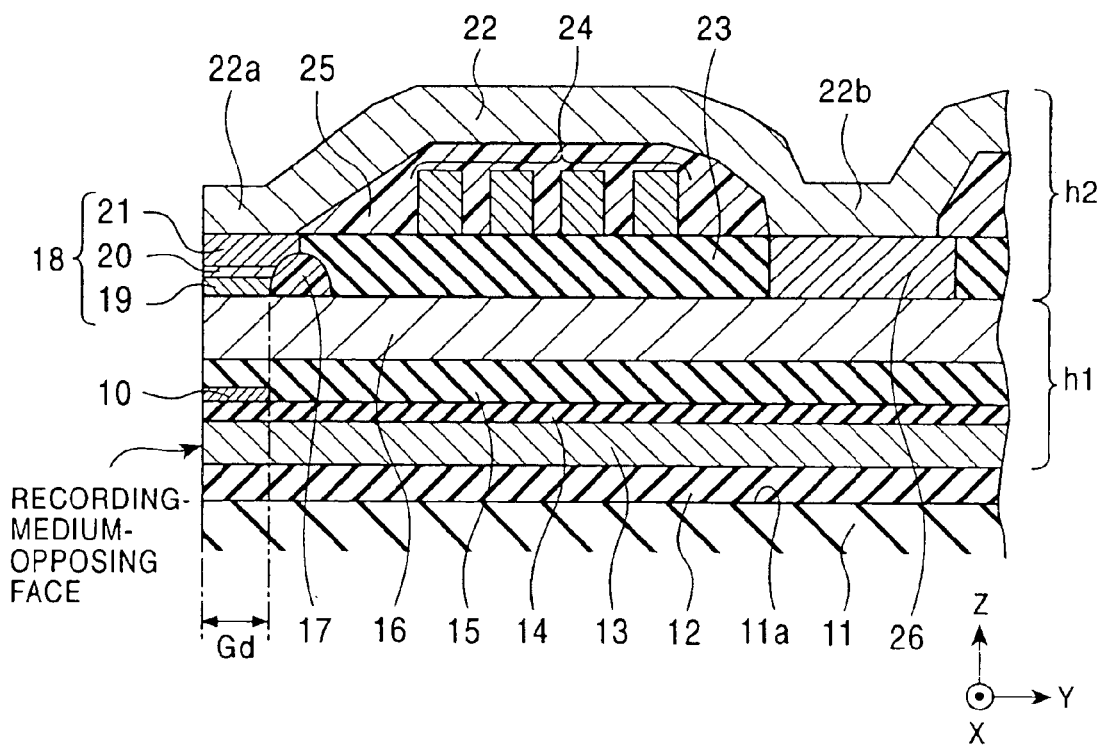
FIG. 2 is a longitudinal cross-sectional view of the thin-film magnetic head shown in FIG. 1 and taken along line II—II.

FIG. 1 is a partial front view of a thin-film magnetic head according to a first embodiment of the present invention, and FIG. 2 is a longitudinal cross-sectional view taken along line II—II as viewed from the direction of arrows in FIG. 1.

The thin-film magnetic head according to the present invention is formed on a side face 11a of a ceramic slider 11 of a floating head. The thin-film magnetic head is an MR/inductive composite thin-film magnetic head including an MR head h1 and an inductive write head h2.

The MR head h1 detects a leakage magnetic field as a recording signal from a recording medium such as a hard disk by a magnetoresistive effect.

Referring now to FIG. 2, an $Al_2O_3$ film 12 is formed on the side face 11a of the slider 11, and a lower shield layer 13 composed of a magnetic material such as NiFe is formed on the $Al_2O_3$ film 12. Furthermore, a lower gap layer 14 composed of an insulating material is formed on the lower shield layer 13.

A magnetoresistive element 10, for example, an anisotropic magnetoresistive (AMR) element, a giant magnetoresistive (GMR) element, or a tunneling magnetoresistive (TMR) element, extends from a face opposing the recording medium (hereinafter referred to as the "recording-medium-opposing face") in the height direction (Y direction in the drawing) on the lower gap layer 14. An upper gap layer 15 composed of an insulating material is formed over the magnetoresistive element 10 and the lower gap layer 14. An upper shield layer 16, composed of a magnetic material such as NiFe, is formed on the upper gap layer 15. Thus, the MR head h1 is a composite film comprising the lower shield layer 13, the upper shield layer 16, and the layers therebetween.

In the first embodiment shown in FIGS. 1 and 2, the upper shield layer 16 also functions as a lower core layer of the inductive write head h2. A gap-defining layer 17 is formed on the upper shield or lower core layer 16 to define the gap depth (Gd) from the recording-medium-opposing face to the front end of the gap-defining layer 17. The gap-defining layer 17 may be composed of, for example, an organic insulating material.

Referring to FIG. 1, the upper faces 16a of the lower core layer 16 descend as one moves away from the base of the magnetic pole unit 18 in the track width direction (the positive and negative X directions in the drawing) to suppress side fringing.

Referring to FIG. 2, the magnetic pole unit 18 extends from the recording-medium-opposing face and partially covers the gap-defining layer 17.

The magnetic pole unit 18 is a laminate of a lower magnetic pole layer 19, a nonmagnetic gap layer 20, and an upper magnetic pole layer 21 (as defined from the bottom).

The lower magnetic pole layer 19 is formed on the lower core layer 16 directly by plating. The gap layer 20 on the lower magnetic pole layer 19 is preferably composed of a nonmagnetic metal that can be formed by plating. Preferably, the gap layer 20 is composed of at least one material selected from the group consisting of NiP, NiPd, NiW, NiMo, Au, Pt, Rh, Pd, Ru, and Cr.

In a preferred embodiment of the present invention, the gap layer 20 is composed of NiP, which can maintain an adequate nonmagnetic state of the gap layer 20.

The upper magnetic pole layer 21 is magnetically coupled with an upper core layer 22 formed thereon.

Thus, the lower magnetic pole layer 19, the gap layer 20, and the upper magnetic pole layer 21 can be continuously formed by plating.

The magnetic pole unit 18 may be composed of two layers of the gap layer 20 and the upper magnetic pole layer 21.

As shown in FIG. 1, the magnetic pole unit 18 defines the track width Tw in the track width direction (X direction in the drawing).

Referring to FIGS. 1 and 2, an insulating layer 23 composed of, for example, an inorganic material, extends on both sides in the track width direction (X direction in the drawings) and behind in the height direction (Y direction in the drawings) of the magnetic pole unit 18. The upper face of the insulating layer 23 is flush with the upper face of the magnetic pole unit 18.

Referring to FIG. 2, a spiral coil layer 24 is formed on the insulating layer 23 by patterning. The coil layer 24 is covered with an organic insulating layer 25. The coil layer 24 may have a multilayer configuration, each sublayer being separated by an insulating sublayer.

The upper core layer 22 is formed over the magnetic pole unit 18 and the insulating layer 25 by patterning and frame plating. As shown in FIG. 1, the leading end 22a, at the recording-medium-opposing face, of the upper core layer 22 has a width T1 in the track width direction. The width T1 is larger than the track width Tw.

The base 22b of the upper core layer 22 is formed directly on a magnetic connecting layer (back gap layer) 26 provided on the lower core layer 16.

In the present invention, the upper magnetic pole layer 21 and/or the lower magnetic pole layer 19 is composed of a soft magnetic film having the following composition.

(1) The composition is represented by the formula $Fe_XCo_Y\alpha_Z$ and is formed by plating, wherein $\alpha$ is at least one element selected from the group consisting of Pd, Pt, Ru, and Ir. The ratio X/Y by mass percent of Fe to Co is in the range of 2 to 5, the α content Z is in the range of 0.5 to 18 mass percent, and X+Y+Z=100 mass percent.

An FeCoα alloy having the above composition has a saturation magnetic flux density Bs of at least 2.0 T according to experimental results described below. Thus, the soft magnetic film according to the present invention has a higher saturation magnetic flux density Bs than that of an NiFe alloy.

Fe and Co have magnetism. An optimized ratio X/Y by mass percent of Fe to Co achieves a high saturation magnetic flux density. According to the experimental results below, a saturation magnetic flux density Bs of at least 2.0 T is achieved at an X/Y ratio in the range of 2 to 5.

The element α is added to enhance corrosion resistance. If the α content Z is too small, corrosion resistance is not achieved. If the α content Z is excessively large, the saturation magnetic flux density Bs decreases due to decreased contents of magnetic Fe and Co. In the present invention, the α content Z is in the range of 0.5 to 18 mass percent so that the saturation magnetic flux density Bs is at least 2.0 T and the corrosion resistance is higher than that of a soft magnetic film composed of only Co and Fe. Preferably, the element α is at least one of Pd and Pt to further enhance corrosion resistance.

Since an FeCoα alloy having the above composition forms a dense crystal phase, the film surface is smooth, thereby enhancing corrosion resistance and decreasing the coercive force Hc to 2,000 A/m or less.

Furthermore, an FeCoα alloy having the above composition exhibits a specific resistance of 15 μΩ·cm or more and a film stress of 400 MPa or less. In addition, this alloy has an anisotropic magnetic field Hk, which is comparable with that of an NiFe-based alloy (which is conventionally used as a soft magnetic material).

In the present invention, the ratio X/Y by mass percent of Fe to Co is preferably in the range of 2.6 to 4.3 and the α content Z is preferably in the range of 3 to 9 mass percent to achieve a saturation magnetic flux density Bs of at least 2.2 T and higher corrosion resistance than that of an α-free FeCo alloy.

In the present invention, the soft magnetic film preferably has a composition represented by the formula $Fe_XCo_Yα_Zβ_V$, wherein β is at least one of Ni and Cr, the ratio X/Y by mass percent of Fe to Co is in the range of 2 to 5 and more preferably in the range of 2.6 to 4.3, the α content Z is in the range of 0.5 to 18 mass percent and more preferably in the range of 3 to 9 mass percent, the β content V is in the range of 0.5 to 5 mass percent, and X+Y+Z+V=100 mass percent.

The upper magnetic pole layer 21 and/or the lower magnetic pole layer 19 comprising a soft magnetic film having such a composition exhibits a saturation magnetic flux density Bs of at least 2.0 T, and at least 2.2 T under optimized conditions. Further more, the element β contributes to higher corrosion resistance due to the formation of a passivation film. Since Ni contributes to decreased film stress, the element β is preferably Ni.

Since the FeCoα or FeCoαβ alloy according to the present invention has a saturation magnetic flux density Bs of at least 2.0 T, and at least 2.2 T under optimized conditions, the upper magnetic pole layer 21 and/or the lower magnetic pole layer 19 composed of the FeCoα or FeCoαβ alloy concentrates the magnetic flux in the vicinity of the gap of the magnetic pole layer, thereby increasing the recording density. Furthermore, the thin-film magnetic head has higher corrosion resistance than that using an FeCo alloy not containing the noble metal α.

In the present invention, the upper magnetic pole layer 21 and/or the lower magnetic pole layer 19 may also be composed of a soft magnetic film having the following composition.

(2) The composition is represented by the formula $Fe_XCo_YRh_W$ and is formed by plating. The Fe content X is 56 mass percent or more, the Co content is 20 mass percent or more; the Rh content Z is in the range of 1.7 to 20 mass percent, and X+Y+W=100 mass percent.

An FeCoRh alloy having the above composition has a saturation magnetic flux density Bs of at least 2.1 T according to experimental results described below. Thus, the soft magnetic film according to the present invention has a higher saturation magnetic flux density Bs than that of an NiFe alloy.

Fe and Co have magnetism. An optimized ratio X/Y by mass percent of Fe to Co achieves a high saturation magnetic flux density. According to the experimental results described below, a saturation magnetic flux density Bs of at least 2.1 T is achieved at an Fe content X of 56 mass percent or more, and at a Co content Y of 20 mass percent or more.

The Rh is added to enhance corrosion resistance. If the Rh content W is too small, the corrosion resistance is not achieved. If the Rh content W is excessively large, the saturation magnetic flux density Bs decreases due to the decreased contents of magnetic Fe and Co. In the present invention, the Rh content W is in the range of 1.7 to 20 mass percent so that the saturation magnetic flux density Bs is at least 2.1 T and the corrosion resistance is higher than that of a soft magnetic film composed of only Co and Fe.

Since an FeCoRh alloy having the above composition forms a dense crystal phase, the film surface is smoother, thereby enhancing corrosion resistance and decreasing the coercive force Hc to 2,000 A/m or less.

Furthermore, an FeCoRh alloy having the above composition exhibits a specific resistance of 15 μΩ·cm or more and a film stress of 400 MPa or less. In addition, this alloy has an anisotropic magnetic field Hk, which is comparable with that of an NiFe-based alloy (which is conventionally used as a soft magnetic material).

In the present invention, the Rh content W is preferably 7.5 mass percent or more to achieve high corrosion resistance, which is comparable with that of the NiFe alloy film, according to the experimental results described below. In particular, if the lower magnetic pole layer 19 and the upper magnetic pole layer 21 do not have high corrosion resistance in the configuration shown in FIGS. 1 and 2 in which the lower magnetic pole layer 19, the nonmagnetic gap layer 20, and the upper magnetic pole layer 21 are continuously formed by plating, the lower magnetic pole layer 19 and the upper magnetic pole layer 21 may not be formed adequately by dissolution during the formation thereof by plating. Thus, the Rh content W in the CoFeRh alloy is preferably 7.5 mass percent or more in the formation of the soft magnetic film by continuous plating.

In the present invention, preferably, the ratio X/Y by mass percent of Fe to Co is in the range of 2.030 to 2.704 and the Rh content W is in the range of 7.5 to 10 mass percent to achieve a saturation magnetic flux density Bs of at least 2.2 T, and corrosion resistance that is comparable with that of an NiFe alloy (which is conventionally used as a core material).

In the present invention, the soft magnetic film preferably has a composition represented by the formula $Fe_XCo_YRh_Wβ_V$, wherein β is at least one of Ni and Cr, the Fe content X is 56 mass percent or more, the Co content Y is 20 mass percent and more, and the Rh content W is in the range of 1.7 to 20 mass percent and more preferably in the range of 7.5 to 20 mass percent. More preferably, the ratio X/Y by mass percent of Fe to Co is in the range of 2.030 to 2.704 and more preferably in the range of 2.6 to 4.3, the Rh content W is in the range of 7.5 to 10 mass percent, the β content V is in the range of 0.5 to 5 mass percent, and X+Y+Z+V=100 mass percent.

The upper magnetic pole layer 21 and/or the lower magnetic pole layer 19 comprising a soft magnetic film having such a composition exhibit a saturation magnetic flux density Bs of at least 2.1 T, and at least 2.2 T under optimized conditions. Further more, the element β contributes to higher corrosion resistance due to the formation of a passivation film. Since Ni contributes to further decreased film stress, the element β is preferably Ni.

As described above, the FeCoRh alloy and FeCoRhβ alloy according to the present invention exhibit a saturation magnetic flux density Bs of at least 2.1 T, and at least 2.2 T under optimized conditions. The upper magnetic pole layer 21 and/or the lower magnetic pole layer 19 composed of such alloys concentrates the magnetic flux to the vicinity of the magnetic pole layer(s), resulting in higher recording density in a thin-film magnetic head including these layers. Furthermore, these alloys exhibit a corrosion resistance that is higher than that of an Rh-free FeCo alloy and is comparable with that of an NiFe alloy.

The soft magnetic films (1) and (2) can be used in a thin-film magnetic head as described below.

Figure 3:
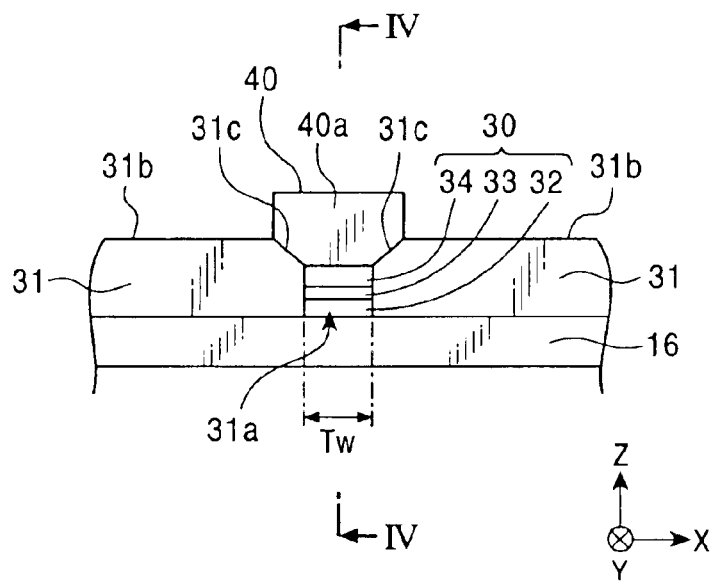
FIG. 3 is a partial front view of a thin-film magnetic head according to a second embodiment of the present invention.
Figure 4:
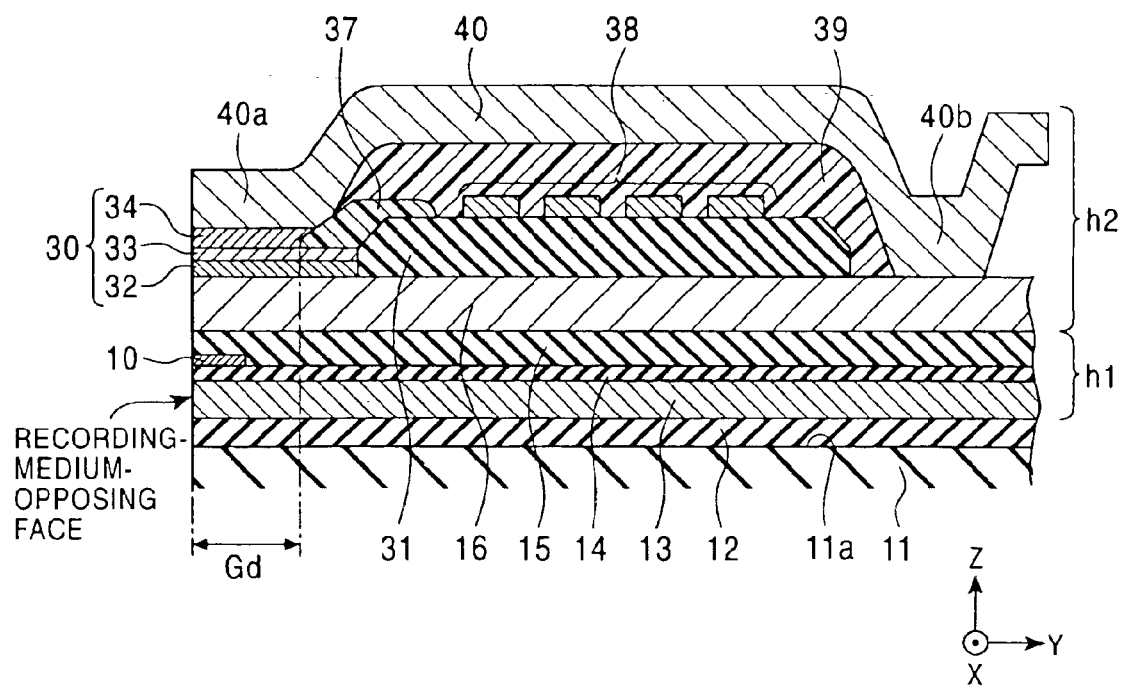
FIG. 4 is a longitudinal cross-sectional view of the thin-film magnetic head shown in FIG. 3 and taken along line IV—IV.

FIG. 3 is a partial front view of a thin-film magnetic head according to a second embodiment of the present invention, and FIG. 4 is a longitudinal cross-sectional view taken along line IV—IV as viewed from the direction of arrows in FIG. 3.

The MR head h1 in the second embodiment has the same structure as that shown in FIGS. 1 and 2.

An insulating layer 31 composed of, for example, an inorganic material is formed on the lower core layer 16. A groove 31a for defining the track width Tw is formed in the insulating layer 31 behind the recording-medium-opposing face in the height direction (Y direction in the drawing). The groove 31a has a predetermined length. As shown in FIG. 3, the groove 31a has a track width Tw at the recording-medium-opposing face.

A magnetic pole unit 30 is formed in the groove 31a. The magnetic pole unit 30 consists of a lower magnetic pole layer 32, a nonmagnetic gap layer 33, and an upper magnetic pole layer 34 (as defined from the bottom)

The lower magnetic pole layer 32 is formed directly on the lower core layer 16 by plating. Preferably, the nonmagnetic gap layer 33 on the lower magnetic pole layer 32 is formed by plating a nonmagnetic material. Preferably, the gap layer 33 is composed of at least one material selected from the group consisting of NiP, NiPd, NiW, NiMo, Au, Pt, Rh, Pd, Ru, and Cr.

In a preferred embodiment of the present invention, the gap layer 33 is composed of NiP, which can maintain an adequate nonmagnetic state of the gap layer 33.

The magnetic pole unit 30 may have a double layer configuration including the nonmagnetic gap layer 33 and the upper magnetic pole layer 34.

A gap-defining layer 37 is formed on the gap layer 33 to define the gap depth (Gd) from the recording-medium-opposing face to the front end of the gap-defining layer 37. The gap-defining layer 37 may be composed of, for example, an organic insulating material.

The upper magnetic pole layer 34 is magnetically coupled with an upper core layer 40 formed thereon.

When the gap layer 33 is composed of a nonmagnetic metal material that can be formed by plating, the lower magnetic pole layer 32, the gap layer 33, and the upper magnetic pole layer 34 can be continuously formed by plating.

Referring to FIG. 4, a spiral coil layer 38 is formed, on the insulating layer 31 by patterning. The coil layer 38 is covered with an organic insulating layer 39.

Referring to FIG. 3, the insulating layer 31 has inclined planes 31c extending from both top edges of the groove 31a in the track width direction (X direction in the drawing) such that the width in the track width direction of the space on the groove 31a gradually increases from the bottom.

As shown in FIG. 4, the leading portion 40a of the upper core layer 40 is formed over the upper magnetic pole layer 34 and the inclined planes 31c of the insulating layer 31.

Referring to FIG. 4, the upper core layer 40 extends from the recording-medium-opposing face to the backside in the height direction (Y direction in the drawing) to cover the insulating layer 39, and the base 40b of the upper core layer 40 is in direct contact with the lower core layer 16.

In the second embodiment shown in FIGS. 3 and 4, the lower magnetic pole layer 32 and/or the upper magnetic pole layer 34 is composed of the soft magnetic film (1) or (2), which is formed by plating to concentrate a magnetic flux density in the vicinity of the gap. A thin-film magnetic head including such a magnetic pole layer exhibits higher recording density and higher corrosion resistance than an α-free FeCo alloy.

In the embodiments shown in FIGS. 1, to 4, the magnetic pole unit 18 is provided between the lower core layer 16 and the upper core layer 24, and the magnetic pole unit 30 is provided between the lower core layer 16 and the upper core layer 40. The lower magnetic pole layers 19 and 32 and/or the upper magnetic pole layers 21 and 34 constituting the magnetic pole units 18 and 30, respectively, are composed of the soft magnetic film (1) or (2) formed by plating. The upper core layers 22 and 40 on the upper magnetic pole layers 21 and 34 are preferably composed of an NiFe alloy that has formed by plating.

It is preferable that the upper core layers 22 and 40 have high specific resistance rather than have high saturation magnetic flux density Bs. In order to adequately introduce a recording magnetic field from the upper core layers 22 and 40 to the upper magnetic pole layers 21 and 34, respectively, in a recording mode at a high-frequency band, the eddy current loss in the upper core layers 22 and 40 must be suppressed. Thus, the use of an NiFe alloy having higher specific resistance in the upper core layers 22 and 40 is advantageous for higher-density recording. An exemplary NiFe alloy has a composition of $Ni_{80}Fe_{20}$.

In the present invention, the upper magnetic pole layers 21 and 34 are composed of the soft magnetic film (1) or (2) and the upper core layers 22 and 40 are composed of an NiFe alloy. Thus, the upper magnetic pole layers 21 and 34 are not dissolved during the formation of the upper core layers 22 and 40, respectively, by electroplating.

The element α or Rh in the present invention is a noble metal that is minimally ionized. Thus, the upper magnetic pole layers 21 and 34 containing such an element are minimally ionized.

If the upper magnetic pole layers 21 and 34 are composed of an FeCoαβ alloy or an FeCoRhαβ alloy, the layers contain the element α or Rh, which is minimally ionized, and Ni and/or Cr, which readily forms a passivation film. Thus, ionization of the constituents in the upper magnetic pole layers 21 and 34 can be more effectively suppressed, and the resulting magnetic pole has a high saturation magnetic flux density Bs and high corrosion resistance.

Preferably, the lower magnetic pole layers 19 and 32 are also composed of the soft magnetic film (1) or (2) to effectively suppress ionization of the constituents in the lower magnetic pole layers 19 and 32, respectively, during the formation of the upper core layers 22 and 40, respectively, by plating.

In the present invention, the lower magnetic pole layers 19 and 32 and/or the upper magnetic pole layers 21 and 34 may have a multilayer configuration including two or more layers. In such a configuration, preferably, the magnetic layers in contact with the gap layer 20 or the gap layer 33 are composed of the soft magnetic film (1) or (2) in order to concentrate the magnetic flux to the vicinity of the gap. A thin-film magnetic head is thereby produced that is suitable for future higher-recording density.

The other magnetic layers not in contact with the gap layer 20 or 33 may be formed of any magnetic material. However, the saturation magnetic flux density Bs of these magnetic layers are preferably lower than the saturation magnetic flux density Bs of the magnetic layers in contact with the gap layer 20 or 33. For example, the other magnetic layers not in contact with the gap layer 20 or 33 are preferably composed of an NiFe alloy. A recording magnetic field is adequately introduced to the magnetic layers in contact with the gap layer 20 or 33, resulting in higher-recording density. Furthermore, the magnetic layers in contact with the gap layer 20 or 30 are prevented from ionization during the formation, by plating, of the other magnetic layers not in contact with the gap layer 20 or 30.

The other magnetic layers need not be formed of the NiFe alloy, but may be formed of the above soft magnetic film (1) or (2). Preferably, the composition of the material for the other magnetic layers is optimized so that the other magnetic layers have a saturation magnetic flux density Bs that is lower than that of the magnetic layer in contact with the gap layer 20 or 33. That is, the Fe content of the other magnetic layers is lower than that of the magnetic layers in contact with the gap layer 20 or 30.

Preferably, the saturation magnetic flux density Bs of the lower magnetic pole layers 19 and 32 is high. In addition, the saturation magnetic flux density Bs of the lower magnetic pole layers 19 and 32 is preferably lower than the saturation magnetic flux density Bs of the upper magnetic pole layers 21 and 34. In such a case, the writing density of signals on the recording medium increases by reversion of a leakage magnetic field between the lower magnetic pole layer and the upper magnetic pole layer.

When the nonmagnetic gap layers 20 and 33, respectively, are formed by plating between the lower magnetic pole layer 19 and the upper magnetic pole layer 21, and between the lower magnetic pole layer 32 and the upper magnetic pole layer 34, as shown in FIGS. 1 to 4, the corrosion resistance of the lower magnetic pole layers 19 and 32 and the upper magnetic pole layers 21 and 34 is preferably substantially the same as that of the NiFe alloy film so as to prevent dissolution of these magnetic pole layers during the plating processes for forming the magnetic pole layers and the gap layer. In the present invention, the lower magnetic pole layers 19 and 32 and the upper magnetic pole layers 21 and 34 are preferably composed of the soft magnetic film (2) having an Rh content of 7.5 mass percent or more.

Figure 5:
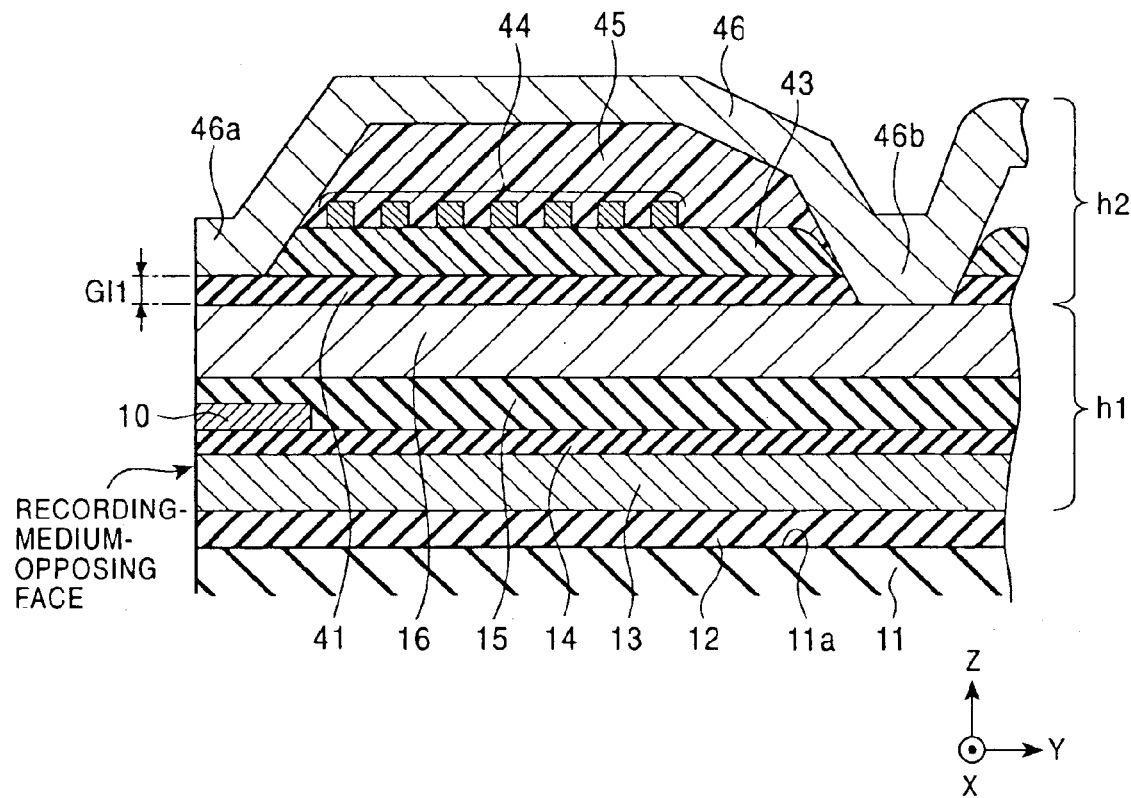
FIG. 5 is a longitudinal cross-sectional view of a thin-film magnetic head according to a third embodiment of the present invention.

FIG. 5 is a longitudinal cross-sectional view of a thin-film magnetic head according to a third embodiment of the present invention.

In the third embodiment, the MR head h1 has the same configuration as that in FIG. 1. Referring to FIG. 5, a gap layer (nonmagnetic layer) 41 composed of, for example, alumina is formed on the lower core layer 16. An insulating layer 43 composed of a polyimide or resist is formed on the gap layer 41, and a spiral coil layer 44 is formed on the resist 43. The coil layer 44 is composed of a nonmagnetic conductive material having low electrical resistance such as copper.

The coil layer 44 is surrounded by an insulating layer 45 composed of a polyimide or resist, and an upper core layer 46 composed of a soft magnetic material, is formed on the insulating layer 45.

The leading portion 46a of the upper core layer 46 faces the lower core layer 16 and is separated by the gap layer 41 at the recording-medium-opposing face to define a magnetic gap with a gap length Gl1. The base 46b of the upper core layer 46 is magnetically coupled with the lower core layer 16.

In the present invention, the lower core layer 16 and/or the upper core layer 46 is composed of the above soft magnetic film (1) or (2). These core layers thereby have a saturation magnetic flux density Bs of at least 2.0 T, and at least 2.1 T under optimized conditions, and higher corrosion resistance as compared with an FeCo alloy not containing the elements α and Rh.

Since the upper core layer 46 and/or the lower core layer 16 is composed of the soft magnetic film (1) or (2) having a high saturation magnetic flux density Bs of at least 2.0 T, and at least 2.1 T under optimized conditions, the magnetic flux is concentrated in the vicinity of the gap. A thin-film magnetic head including these core layers is suitable for future higher recording density and exhibits higher corrosion resistance than that of an FeCo alloy not containing the elements α and Rh.

When the gap layer 41 is sputtered film composed of alumina ($Al_2O_3$) or $SiO_2$, as shown in FIG. 5, the core layers 16 and 46 thereunder/thereon must have higher corrosion resistance than that of the FeCo alloy film to prevent redissolution of these layers during the formation by plating of these layers. Thus, when the core layers 16 and 46 are composed of the soft magnetic film (2), the Rh content W is preferably 1.7 mass percent or more.

Figure 6:
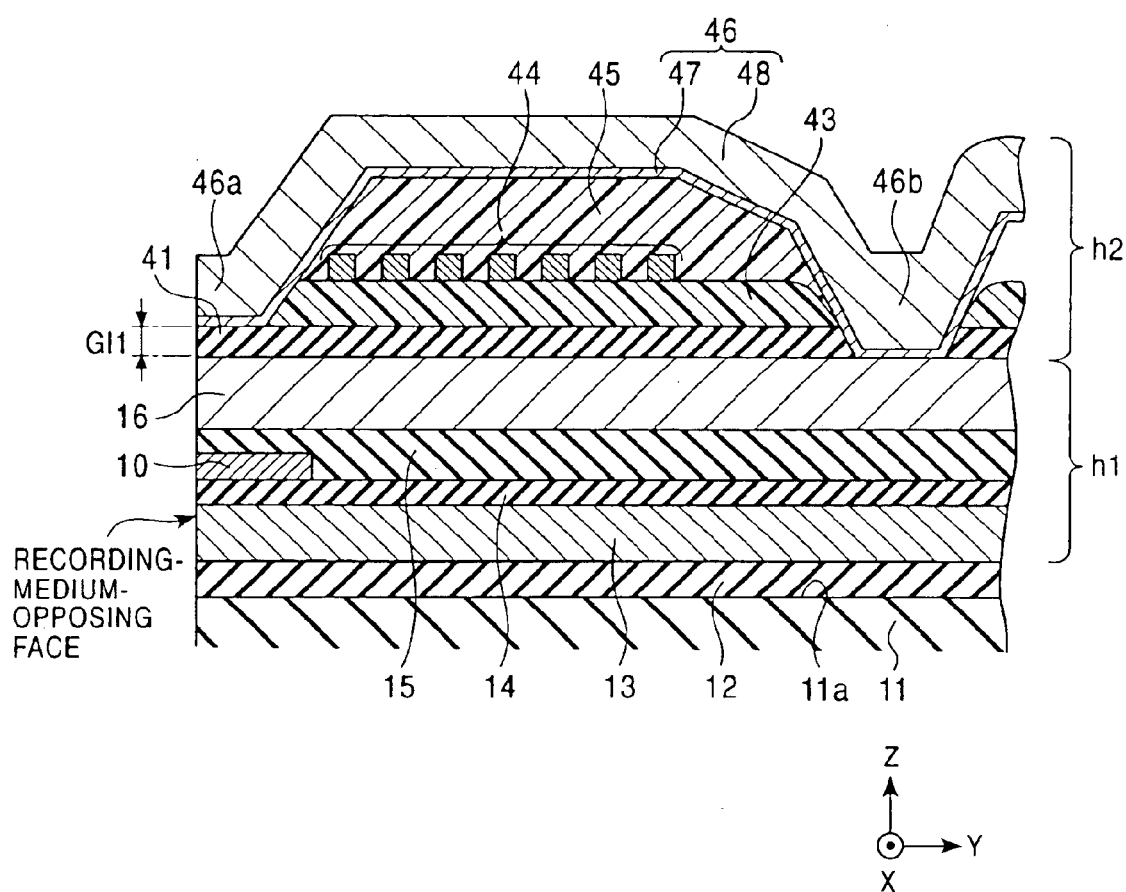
FIG. 6 is a longitudinal cross-sectional view of a thin-film magnetic head according to a fourth embodiment of the present invention.

FIG. 6 is a longitudinal cross-sectional view of a thin-film magnetic head according to a fourth embodiment of the present invention. In this embodiment, and in contrast to FIG. 5 the upper core layer 46 includes two magnetic sublayers.

The upper core layer 46 includes a high Bs sublayer 47 having a high saturation magnetic flux density Bs and an overlying sublayer 48 formed on the high Bs sublayer 47.

The high Bs sublayer 47 and/or the lower core layer 16 is composed of the soft magnetic film (1) or (2). Thus, these layers have a saturation magnetic flux density Bs of at least 2.0 T, and at least 2.1 T under optimized conditions, and higher corrosion resistance as compared with an FeCo alloy not containing the elements α and Rh.

The overlaying sublayer 48 constituting the upper core layer 46 has a lower saturation magnetic flux density Bs than that of the high Bs sublayer 47 and a higher specific resistance than that of the high Bs sublayer 47. For example, the overlying sublayer 48 is composed of an $Ni_{80}Fe_{20}$ alloy.

The NiFe alloy has a lower saturation magnetic flux density Bs, but has a higher specific resistance, as compared with the FeCoα, FeCoNiαβ, FeCoRh, and FeCoRhβ alloys. Thus, the high Bs sublayer 47 having a higher saturation magnetic flux density Bs, as compared with the overlying sublayer 48, concentrates the magnetic flux in the vicinity of the gap, resulting in higher recording resolution. The overlying sublayer 48 need not be composed of the NiFe alloy, but may be composed of, for example, an FeCoα or FeCoRh alloy. In such a case, the composition of the overlying sublayer 48 must be adjusted such that the saturation magnetic flux density Bs of the overlying sublayer 48 is higher than the saturation magnetic flux density Bs of the high Bs sublayer 47. One method for accomplishing this is to reduce the Fe content in the overlying sublayer 48 relative to the high Bs sublayer 47.

The overlying sublayer 48 having high specific resistance reduces eddy current loss, which occurs at higher recording frequencies. Thus, a thin-film magnetic head including the overlying sublayer 48 is suitable for trends towards higher recording frequencies.

As shown in FIG. 6, the high Bs sublayer 47 is preferably the lower sublayer facing the gap layer 41. The high Bs sublayer 47 may be formed only below the leading portion 46a of the upper core layer 46 in direct contact with the gap layer 41.

Also the lower core layer 16 may have a double layer configuration including a high-Bs sublayer and a high-specific-resistance sublayer. In such a configuration, the high-Bs sublayer is deposited on the high-specific-resistance sublayer and opposes the upper core layer 46 with the gap layer 41 provided therebetween.

In the embodiment shown in FIG. 6, the upper core layer 46 has a double layer configuration. Alternatively, the upper core layer 46 may include three or more sublayers. In a multilayer configuration, the high Bs sublayer 47 is preferably in contact with the gap layer 41.

When the high Bs sublayer 47 is formed of the soft magnetic film (1) or (2), dissolution of the high Bs sublayer 47 is adequately prevented during the formation, by electroplating, of the overlying sublayer 48 composed of an NiFe alloy. This is because the high Bs sublayer 47 contains a noble metal, which is minimally ionized, such as Rh, Pt, Pd, Ru, or Ir, or contains Ni, which readily forms a passivation film, at the surface.

Figure 7:
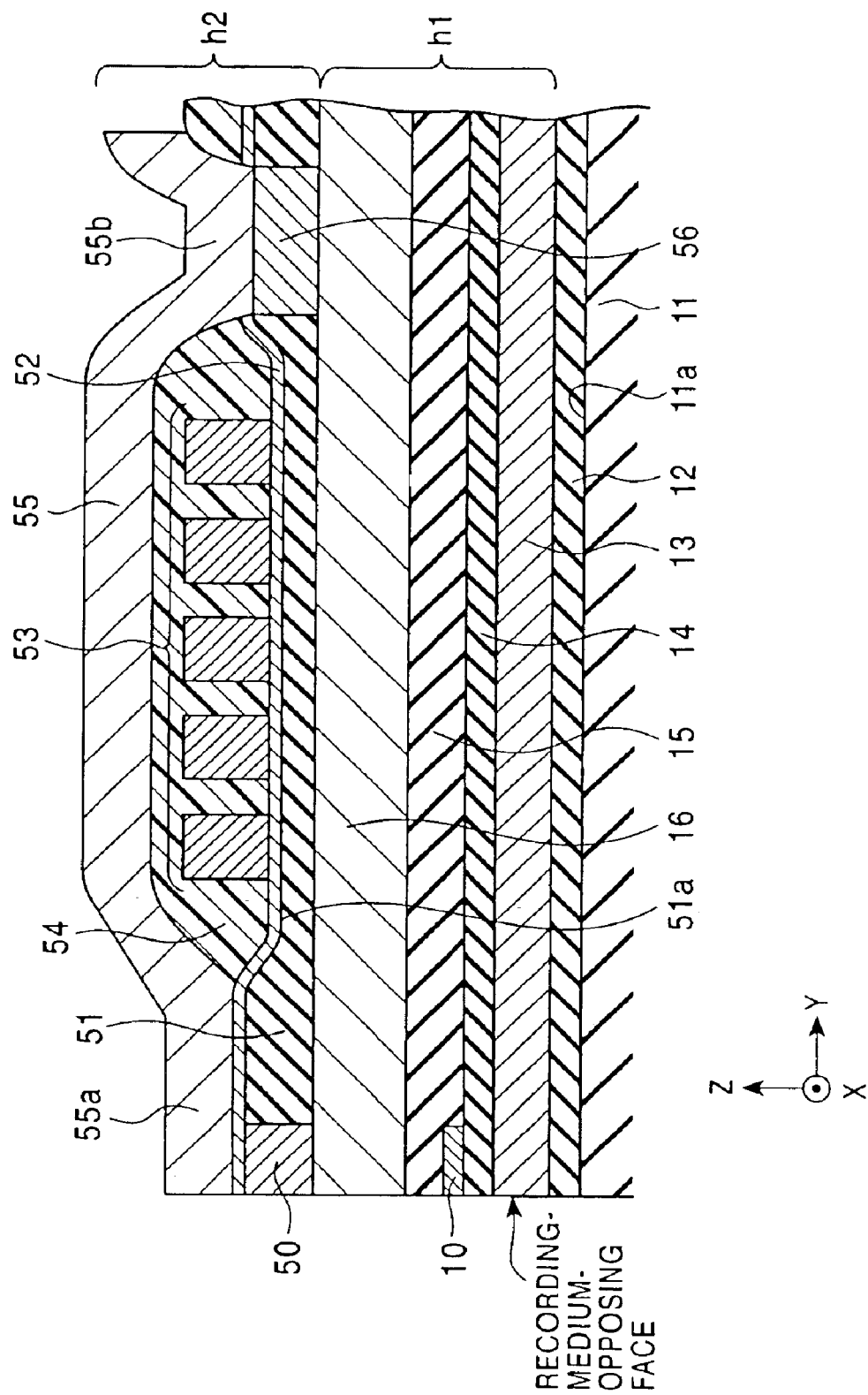
FIG. 7 is a longitudinal cross-sectional view of a thin-film magnetic head according to a fifth embodiment of the present invention.

FIG. 7 is a longitudinal cross-sectional view of a thin-film magnetic head according to a fifth embodiment of the present invention.

In the fifth embodiment, the MR head h1 has the same configuration as that shown in FIG. 1. Referring to FIG. 7, a lower magnetic pole layer 50 is formed at the recording-medium-opposing face on the lower core layer 16. An insulating layer 51 is formed behind the lower magnetic pole layer 50 in the height direction (Y direction in the drawing). The upper face of the insulating layer 51 is concave for forming a coil-forming face 51a.

A gap layer 52 is formed over the lower magnetic pole layer 50 and the insulating layer 51. A coil layer 53 is formed on the gap layer 52 above the coil-forming face 51a. The coil layer 53 is covered with an organic insulating layer 54.

A patterned upper core layer 55 is formed over the gap layer 52 and the nonmagnetic insulating layer 54, for example, by frame plating.

The leading portion 55a of the upper core layer 55 faces the lower magnetic pole layer 50 with the lower magnetic pole layer 50 therebetween. The base 55b of the upper core layer 55 is magnetically coupled with the lower core layer 16 via a bank layer 56 provided on the lower core layer 16.

In this embodiment, the upper core layer 55 and/or the lower magnetic pole layer 50 is composed of the soft magnetic film (1) or (2). These layers therefore have a saturation magnetic flux density Bs of at least 2.0 T, and at least 2.1 T under optimized-conditions, and higher corrosion resistance as compared with an FeCo alloy not containing the elements α and Rh.

The lower magnetic pole layer 50 and the upper core layer 55, which are composed of the soft magnetic film (1) or (2), concentrate the magnetic flux in the vicinity of the gap, thereby resulting in increased recording density. Thus, the resulting thin-film magnetic head is suitable for higher recording density and has higher corrosion resistance than that of an FeCo alloy not containing the elements α and Rh. Preferably, the saturation magnetic flux density Bs is at least 2.2 T.

In FIG. 7, when the lower magnetic pole layer 50 is composed of the soft magnetic film (1) or (2), which has a higher saturation magnetic flux density Bs than that of the lower core layer 16, the magnetic flux can be concentrated in the vicinity of the gap, thus increasing recording density.

The entire upper core layer 55 may be formed of the soft magnetic film (1) or (2). Alternatively, the upper core layer 55 may have a multilayer configuration as in the upper core layer 46 shown in FIG. 6, and the sublayer in contact with the gap layer 52 may be formed of the soft magnetic film (1) or (2) as a high-Bs sublayer. In such a case, preferably, only the leading portion 55a of the upper core layer 55 will have a multilayer configuration such that a high-Bs layer is in contact with the gap layer 52 in order to concentrate the magnetic flux in the vicinity of the gap and increase the recording density.

In the above embodiments, the layer 16 functions as both the lower core layer and the upper shield layer. Alternatively, the lower core layer and the upper shield layer may be independently formed. In this case, the lower core layer and the upper shield layer are separated by an insulating layer.

A method for making the thin-film magnetic heads shown in FIGS. 1 to 7 will now be described.

The thin-film magnetic head shown in FIGS. 1 and 2 is formed as follows. The gap-defining layer 17 is formed on the lower core layer 16. Next, the lower magnetic pole layer 19, the nonmagnetic gap layer 20, and the upper magnetic pole layer 21 are deposited on the gap-defining layer 17 by continuous plating using a resist to form the magnetic pole unit 18 extending from the recording-medium-opposing face to the backside in the height direction. After the insulating layer 23 is formed behind the magnetic pole unit 18 in the height direction, the magnetic pole unit 18 and the insulating layer 23 are planarized by a chemical-mechanical polishing (CMP) process such that these are flush with each other. The spiral coil layer 24 is formed on the insulating layer 23 by patterning, and then the insulating layer 25 is formed on the coil layer 24. The upper core layer 22 is formed over the magnetic pole unit 18 and the insulating layer 25, for example, by frame plating.

The thin-film magnetic head shown in FIGS. 3 and 4 is formed as follows. After the insulating layer 31 is formed on the lower core layer 16, the groove 31a is formed in the insulating layer 31 using a resist so as to extend from the recording-medium-opposing face to the backside in the height direction. The inclined planes 31c shown in FIG. 3 are formed on the groove 31a.

The lower magnetic pole layer 32 and the nonmagnetic gap layer 33 are formed in the groove 31a. After the gap-defining layer 37 is formed over the gap layer 33 and the insulating layer 31, the upper, magnetic pole layer 34 is formed on the gap layer 33 by plating. After the spiral coil layer 38 is formed on the insulating layer 31 by patterning, the insulating layer 39 is formed on the coil layer 38. The upper core layer 40 is formed over the upper magnetic pole layer 34 and the insulating layer 39, for example, by frame plating.

The thin-film magnetic head shown in FIGS. 5 and 6 is formed as follows. After the gap layer 41 is formed on the lower core layer 16, the insulating layer 43 is formed on the gap layer 41. The coil layer 44 is formed on the insulating layer 43 by patterning. After the insulating layer 45 is formed on the coil layer 44, the upper core layer 46 is formed over the gap layer 41 and the insulating layer 45 by frame plating.

The thin-film magnetic head shown in FIG. 7 is formed as follows. The lower magnetic pole layer 50 is formed on the lower core layer 16 using a resist, and the insulating layer 51 is formed behind the lower magnetic pole layer 50 in the height direction. After the lower magnetic pole layer 50 and the insulating layer 51 are planarized by a CMP process, the indented coil-forming face 51a is formed on the planarized top face of the gap layer 41. The gap layer 52 is formed over the lower magnetic pole layer 50 and the insulating layer 51, and then the spiral coil layer 53 is formed on the gap layer 52 by patterning. The insulating layer 54 is then formed on the coil layer 53. The upper core layer 55 is then formed over the gap layer 52 and the nonmagnetic insulating layer 54, for example, by frame plating.

A method for plating the $Fe_XCo_Y\alpha_Z$ alloy will now be described. As described above, this alloy has the following composition. The element α is at least one noble metal selected from the group consisting of Pd, Pt, Ru, and Ir, the ratio X/Y by mass percent of Fe to Co is in the range of 2 to 5, the α content Z is in the range of 0.5 to 18 mass percent, and X+Y+Z=100 mass percent.

The FeCoα alloy layer is formed by electroplating.

In general, the electroplating uses a continuous DC or a pulsed current. In the present invention, electroplating using a continuous DC may be employed. However, electroplating using a pulsed current is preferable for the following reason.

In electroplating using a pulsed current, an operation time for energizing the system and a dead time for suspending the energizing are repeated during the plating process, for example, by an ON/OFF switching operation using a current control element. By introducing the dead time, the FeCoα alloy film is gradually deposited during the plating process, and the current density in the system becomes more uniform as compared with plating by a continuous DC.

Preferably, the duty ratio is in the range of about 0.1 to 0.5. Such a duty ratio is achieved by repeating the ON/OFF switching operation for a cycle of several seconds. The pulsed current condition affects the average crystal grain size in the FeCoα alloy and the centerline average roughness Ra of the film.

As described above, pulsed-current plating moderates an uneven distribution of the current density during the plating process.

In the present invention, the Fe ion concentration is in the range of 1.2 to 3.2 g/liter, the Co ion concentration is in the range of 0.86 to 1.6 g/liter, and the α ion concentration is in the range of 0.2 to 6 mg/liter. As shown in the experimental results discussed below, by controlling these ion concentrations, the ratio X/Y of Fe to Co can be set within the range of 2 to 5 and the α content Z can be set within the range of 0.5 to 18 mass percent in the plated $Fe_XCo_Y\alpha_Z$ alloy.

In the above plating bath composition, the Fe ion concentration is lower than that in conventional bath compositions. For example, a typical conventional bath composition has an Fe ion concentration of about 4.0 g/liter. In the present invention, the Fe ion concentration is decreased to enhance the stirring efficiency. As a result, the FeCoα alloy film can have an increased Fe content and can contain dense crystals, resulting in high corrosion resistance.

In the plated $Fe_XCo_Y\alpha_Z$ alloy, preferably, the ratio X/Y by mass percent of Fe to Co is in the range of 2.6 to 4.3 and the α content Z is in the range of 3 to 9 mass percent. Such a composition is readily achieved by adjusting the above plating bath composition. The plated $Fe_XCo_Y\alpha_Z$ alloy having the preferable composition exhibits a saturation magnetic flux density Bs of at least 2.2 T.

In the present invention, the plating bath may contain β ions to form an $Fe_XCo_Y\alpha_Z\beta_V$ alloy by plating. Preferably, the β ion concentration in the plating bath is in the range of 0.3 g/liter to 1 g/liter. The β content V can be thereby controlled within the range of 0.5 to 5 mass percent in the plated $Fe_XCo_Y\alpha_Z\beta_V$ alloy.

A method for plating the $Fe_XCo_YRh_W$ alloy will now be described. As described above, this alloy has the following composition. The Fe content X is 56 mass percent or more, the Co content Y is 20 mass percent or more, the Rh content W is in the range of 1.7 to 20 mass percent, and X+Y+W=100 mass percent.

The FeCoRh alloy layer is formed by electroplating.

In general, the electroplating uses a continuous DC or a pulsed current. In the present invention, electroplating using a continuous DC may be employed. However, electroplating using a pulsed current is preferable for the above-mentioned reason. That is, pulsed-current plating moderates any uneven distribution of the current density during the plating process.

In the present invention, the Fe ion concentration is in the range of 1.0 to 5.0 g/liter, the Co ion concentration is in the range of 0.1 to 5.0 g/liter, and the Rh ion concentration is in the range of 1.0 to 10.0 mg/liter. As shown in the experimental results below, by controlling these ion concentrations, the Fe content X can be set to 56 mass percent or more, the Co content Y can be set to 20 mass percent, and the Rh content W can be set within the rang of 1.7 to 20 mass percent in the plated $Fe_XCo_YRh_Z$ alloy.

In the above plating bath composition, the Fe ion concentration is lower than that in conventional bath compositions. For example, a typical conventional bath composition has an Fe ion concentration of about 4.0 g/liter. In the present invention, the Fe ion concentration is decreased to enhance the stirring efficiency. As a result, the FeCoRh alloy film can have an increased Fe content and can contain dense crystals, resulting in high corrosion resistance.

In the plated $Fe_XCo_YRh_W$ alloy, the Rh content W is preferably 7.5 mass percent or more. Such a composition is readily achieved by adjusting the above plating bath composition. A soft magnetic film of the plated $Fe_XCo_YRh_W$ alloy having the preferable composition exhibits corrosion resistance, which is comparable with that of an NiFe alloy film.

In the plated $Fe_XCo_YRh_W$ alloy, preferably, the ratio X/Y by mass percent of Fe to Co is in the range of 2.030 to 2.704, and the Rh content W is in the range of 7.5 to 10 mass percent. Such a composition is readily achieved by adjusting the above plating bath composition. The plated $Fe_XCo_YRh_W$ alloy having the preferable composition exhibits a saturation magnetic flux density Bs of at least 2.2 T, and corrosion resistance that is comparable with that of an NiFe alloy film.

In the present invention, the plating bath may contain β ions to form an $Fe_XCo_YRh_Wβ_V$ alloy by plating. Preferably, the β ion concentration in the plating bath is in the range of 10.0 g/liter to 20.0 g/liter. The β content V can be thereby controlled within the range of 0.5 to 5 mass percent in the plated $Fe_XCo_YRh_Wβ_V$ alloy.

Preferably, the plating bath composition for forming the FeCoα, FeCoαβ, FeCoRh, or FeCoRhβ alloy contains sodium saccharine ($C_6H_4CONNaSO_2$). Sodium saccharine functions as a stress relaxant to decrease the film stress of the plated FeCoα, FeCoαβ, FeCoRh, or FeCoRhβ alloy.

Alternatively, the plating bath composition for forming the FeCoα, FeCoαβ, FeCoRh, or FeCoRhβ alloy may contain 2-butyne-1,4-diol. This compound suppresses coarsening of the crystal grains in the plated alloy, and thus reduces the coercive force Hc of the alloy.

Alternatively, the plating bath composition for forming the FeCoα, FeCoαβ, FeCoRh, or FeCoRhβ alloy may contain sodium 2-ethylhexyl sulfate.

Sodium 2-ethylhexyl sulfate is a surfactant. This compound removes hydrogen, which is generated during the plating process for forming the FeCoα, FeCoαβ, FeCoRh, or FeCoRhβ alloy. Hydrogen trapped on the surface of the plated film precludes the formation of dense crystals, resulting in a roughening of the surface. Since hydrogen is removed from the surface of the plated film in the present invention, the plated film has a smooth surface and thus a small coercive force Hc.

Sodium 2-ethylhexyl sulfate may be replaced with sodium laurylsulfate. However, bubbling readily occurs in the plating bath containing sodium laurylsulfate as compared with the plating bath containing sodium 2-ethylhexyl sulfate. Thus, it is difficult to determine the content of sodium laurylsulfate not causing bubbling. Accordingly, sodium 2-ethylhexyl sulfate, which minimally causes bubbling, is preferably added in an amount that can effectively remove hydrogen.

The plating bath preferably contains boric acid. Boric acid functions as a pH buffer at the electrode surface and is effective for the formation of a glossy plated surface.

The core layers and the magnetic pole layers in FIGS. 1 to 7 are formed by the above-described method for plating the soft magnetic film.

The soft magnetic film (1) or (2) can be readily formed with high reproducibility by the above method. The thin-film magnetic head exhibits a saturation magnetic flux density Bs of at least 2.0 T, and at least 2.1 T in optimized conditions, which is suitable for higher-density recording, and has a high corrosion resistance.

The soft magnetic films (1) and (2) in the present invention may be used in any application, for example, planar magnetic elements such as thin-film inductors, in addition to the thin-film magnetic heads shown in FIGS. 1 to 7.

EXAMPLES

FeCoPd alloys having various compositions were formed by pulsed-current plating in plating baths containing the following components to examine the relationship between the alloy composition and the saturation magnetic flux density Bs.

(Components in Plating Bath)
(1) $FeSO_4.7H_2O$: 6 to 16 g/liter (Fe ion concentration: 1.2 to 3.2 g/liter)
(2) $CoSO_4.7H_2O$: 4.1 to 7.6 g/liter (Co ion concentration: 0.86 to 1.6 g/liter)
(3) $PdCl_2$ 0 to 10 mg/liter (Pd ion concentration: 0 to 6 mg/liter)
(4) sodium saccharine: 2 g/liter
(5) sodium chloride: 25 g/liter
(6) boric acid: 25 g/liter
(7) sodium 2-ethylhexyl sulfate: 0.15 ml/liter Each film was deposited under the following common conditions.

The pH value of the electrode was 2.3. The duty (ON/OFF) ratio of the pulsed current was 500/500 ms, and the current was 500 to 1,000 mA.

After a Cu underlayer was formed on a Si substrate by sputtering, an FeCoPd or FeCo alloy layer with a thickness in the range of 0.5 μm to 1 μm was plated on the Cu underlayer in each plating bath.

The results are shown in Table 1.

TABLE 1

| Sample | Content (mass percent) | | | Fe/Co Ratio | Bs* |
| --- | --- | --- | --- | --- | --- |
| | Fe | Co | Pd | | |
| 1 | 64 | 36 | 0 | 1.78 | 2.01 |
| 2 | 72 | 28 | 0 | 2.57 | 2.22 |
| 3 | 73 | 27 | 0 | 2.7 | 2.21 |
| 4 | 73 | 27 | 0 | 2.7 | 2.23 |
| 5 | 77 | 23 | 0 | 3.35 | 2.27 |
| 6 | 77 | 23 | 0 | 3.35 | 2.28 |
| 7 | 80 | 20 | 0 | 4 | 2.2 |
| 8 | 82 | 18 | 0 | 4.56 | 2.2 |
| 9 | 83 | 17 | 0 | 4.88 | 2.11 |
| 10 | 84 | 16 | 0 | 5.25 | 2.01 |
| 11 | 78.72 | 20.78 | 0.5 | 3.78 | 2.18 |
| 12 | 70.41 | 27.95 | 1.64 | 2.52 | 2.28 |
| 13 | 67.84 | 30.08 | 2.08 | 2.26 | 2.1 |
| 14 | 80.75 | 17.03 | 2.22 | 4.74 | 2.05 |
| 15 | 76.92 | 20.63 | 2.45 | 3.73 | 2.22 |
| 16 | 64.33 | 32.88 | 2.79 | 1.96 | 2 |
| 17 | 73.1 | 24.01 | 2.89 | 3.04 | 2.25 |
| 18 | 72 | 25 | 3 | 2.88 | 2.25 |
| 19 | 75.03 | 21.74 | 3.23 | 3.45 | 2.24 |
| 20 | 70.93 | 25.82 | 3.25 | 2.75 | 2.22 |
| 21 | 65.02 | 31.28 | 3.7 | 2.08 | 2.17 |
| 22 | 76.92 | 19.3 | 3.78 | 3.99 | 2.21 |
| 23 | 68.33 | 27.31 | 4.36 | 2.5 | 2.1 |
| 24 | 68 | 27 | 5 | 2.52 | 2.26 |
| 25 | 70 | 25 | 5 | 2.8 | 2.21 |
| 26 | 72.11 | 22.39 | 5.5 | 3.22 | 2.23 |
| 27 | 75.3 | 19.2 | 5.5 | 3.92 | 2.22 |
| 28 | 57.27 | 35.29 | 7.44 | 1.62 | 2.18 |
| 29 | 68.54 | 23.36 | 8.1 | 2.93 | 2.17 |
| 30 | 65.37 | 25.63 | 9 | 2.55 | 2.18 |
| 31 | 73.99 | 17.01 | 9 | 4.35 | 2.09 |
| 32 | 63.51 | 26.59 | 9.9 | 2.39 | 2.11 |
| 33 | 55.55 | 26.9 | 17.55 | 2.07 | 2.01 |

Figure 8:
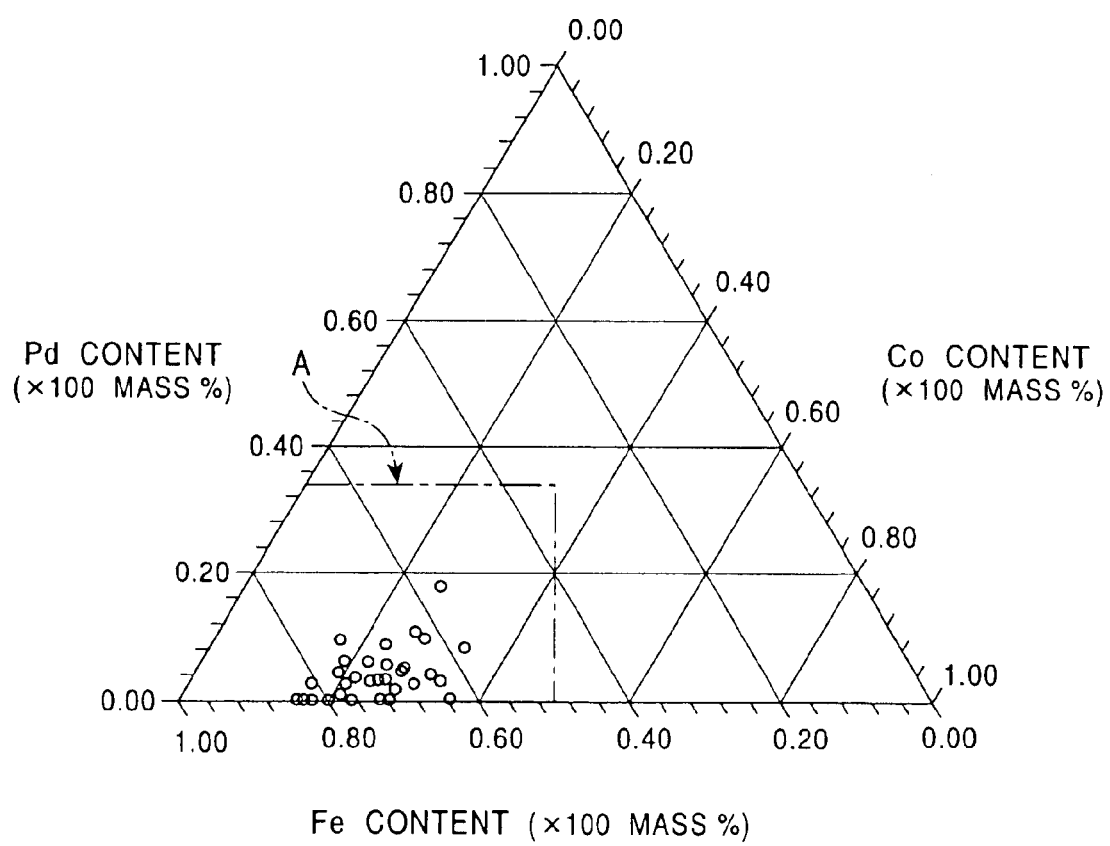
FIG. 8 is a ternary diagram illustrating the relationship between the composition and the saturation magnetic flux density of FeCoPd alloys and FeCo alloys, which have been formed by electroplating.

FIG. 8 is a ternary diagram illustrating the relationship between the Fe, Co, and Pd contents and the saturation magnetic flux density Bs that are shown in Table 1.

Figure 9:
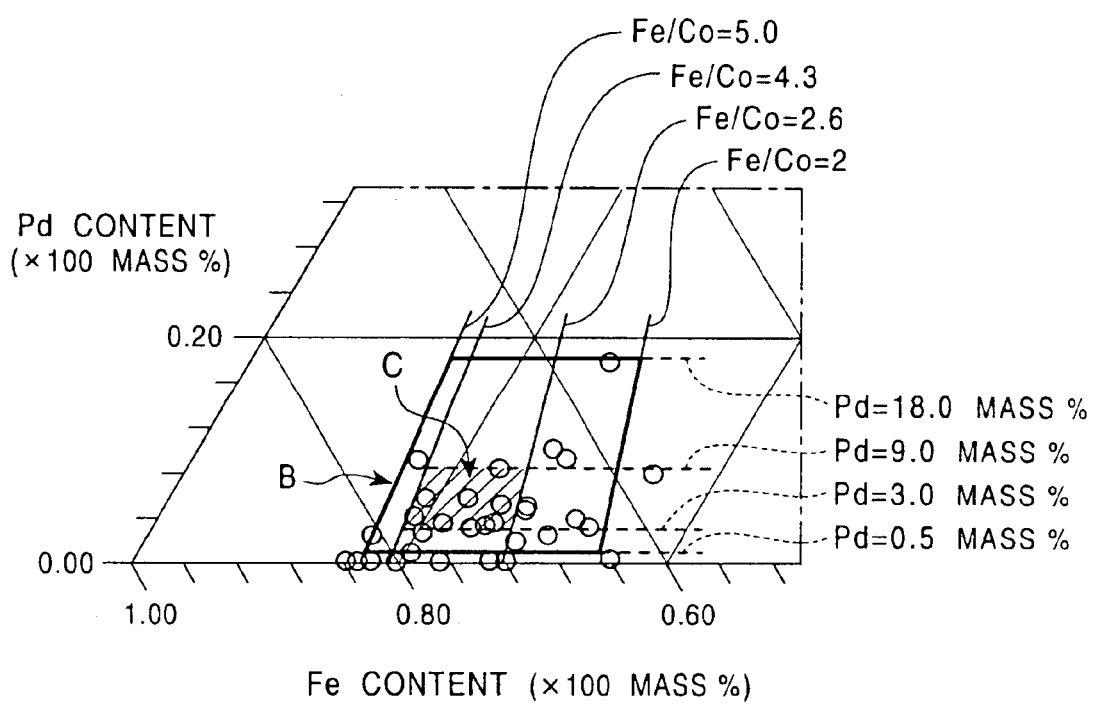
FIG. 9 is a partial enlarged ternary diagram corresponding to Region A in FIG. 8.

FIG. 9 is a partial enlarged ternary diagram corresponding to Region A in FIG. 8.

The results shown in Table 1 and FIGS. 8 and 9 demonstrate that each soft magnetic film exhibits a saturation magnetic flux density Bs of at least 2.0 T, and high corrosion resistance as compared with Pd-free FeCo alloys, when the film comprises a composition which is within Region B surrounded by a line corresponding to the Fe/Co (X/Y) ratio by mass percent of 5, a line corresponding to the Fe/Co (X/Y) ratio by mass percent of 2, a line corresponding to the Pd content of 18 mass percent, and a line corresponding to the Pd content of 0.5 mass percent.

Also the results demonstrate that each soft magnetic film exhibits a saturation magnetic flux density Bs of at least 2.2 T, and a high corrosion resistance as compared with Pd-free FeCo alloys, when the film comprises compositions which are within Region B surrounded by a line corresponding to the Fe/Co (X/Y) ratio by mass percent of 4.3, a line corresponding to the Fe/Co (X/Y) ratio by mass percent of 2.6, a line corresponding to the Pd content of 9 mass percent, and a line corresponding to the Pd content of 3 mass percent.

The preferable Fe/Co (X/Y) ratio by mass percent was determined based on the saturation magnetic flux density Bs.

Figure 10:
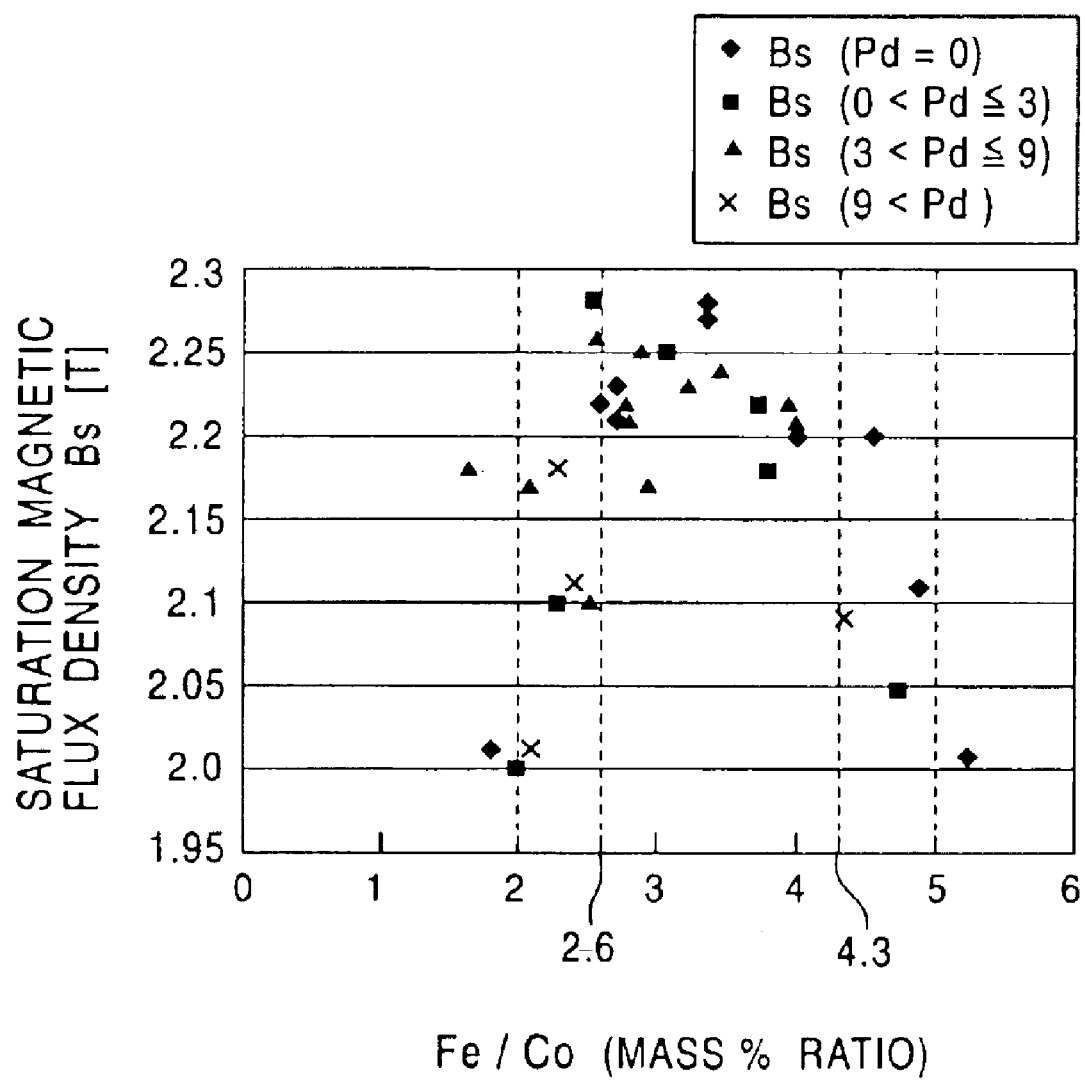
FIG. 10 is a graph illustrating the relationship between the Fe/Co ratio by mass percent and the saturation magnetic flux density.

FIG. 10 is a graph illustrating the relationship between the Fe/Co ratio by mass percent and the saturation magnetic flux density of samples shown in Table 1.

FIG. 10 shows that the alloy has a saturation magnetic flux density Bs of at least 2.0 at an Fe/Co (X/Y) ratio in the range of 2 to 5.

FIG. 10 also shows that the alloy has a saturation magnetic flux density Bs of at least 2.2 at an Fe/Co (X/Y) ratio in the range of 2.6 to 4.3.

The saturation magnetic flux density Bs also depends on the Pd content, as shown in FIG. 10. The saturation magnetic flux density Bs decreases with an increased Pd content due to a decreased content in magnetic elements Fe and Co even if the Fe/Co (X/Y) ratio is within the above range.

An adequate amount of Pd must be added to the FeCo alloy to enhance corrosion resistance.

Experiments were performed to determine the preferable Pd content.

The relationship between the Pd content in the FeCo alloy and the corrosion resistance was examined using six samples shown in Table 1. Each sample has the following layer configuration: $Fe_{20}Ni_{80}$ alloy film/soft magnetic film/NiP alloy film/$Fe_{60}Ni_{40}$ film.

Sample 2 ($Fe_{72}Co_{28}$ alloy), Sample 11 ($Fe_{78.72}Co_{20.78}Pd_{0.5}$ alloy), Sample 24 ($Fe_{68}Co_{27}Pd_5$ alloy), Sample 32 ($Fe_{63.51}Co_{26.59}Pd_{9.9}$ alloy), and Sample 33 ($Fe_{55.55}Co_{26.9}Pd_{17.55}$ alloy), as listed in Table 1, were prepared by pulsed-current plating. Furthermore, Sample 34 ($Fe_{70}Ni_{30}$ alloy) was also prepared.

Each sample was immersed into hot pure water (60° C.), pure water (45° C.), tap water (45° C.), or diluted sulfuric acid (pH=2, 45° C.) to evaluate corrosion resistance according to ten ranks of a cut cross section. Rank 10 means that the soft magnetic film is not corroded (the highest corrosion resistance) whereas Rank 1 means that the soft magnetic film is almost completely corroded (the lowest corrosion resistance).

The results are summarized in Table 2.

TABLE 2

| Sample | Composition of soft magnetic film | Hot pure water 60° C. | Pure water 45° C. | Tap water 45° C. | Sulfuric acid 45° C. |
|---|---|---|---|---|---|
| 2 | $Fe_{72}Co_{28}$ | 3 | 6 | 4 | 5 |
| 11 | $Fe_{78.72}Co_{20.78}Pd_{0.5}$ | 3 | 6 | 5 | 7 |
| 24 | $Fe_{68}Co_{27}Pd_5$ | 5 | 7 | 5 | 7 |
| 32 | $Fe_{63.51}Co_{26.59}Pd_{9.9}$ | 7 | 8 | 5 | 9 |
| 33 | $Fe_{55.55}Co_{26.9}Pd_{17.55}$ | 10 | 10 | 9 | 10 |
| 34 | $Fe_{70}Ni_{30}$ | 10 | 9 | 7 | 9 |

Table 2 shows that Sample 34 ($Fe_{70}Ni_{30}$ alloy) exhibits high corrosion resistance to all the solutions.

In contrast, Sample 2 ($Fe_{72}Co_{28}$ alloy) exhibits low corrosion resistance to hot pure water at 60° C. (Rank 3), to tap water at 45° C. (Rank 4), and to diluted sulfuric acid at 45° C. (Rank 5).

A possible reason for low corrosion resistance of the $Fe_{72}Co_{28}$ alloy soft magnetic film is as follows. When an $Fe_{60}Ni_{40}$ film is electroplated on the $Fe_{72}Co_{28}$ alloy film, a large potential difference (standard electrode potential difference) is generated between the FeCo alloy film and the NiFe alloy film, which causes dissolution of the FeCo alloy film by the galvanic effect.

In contrast, Sample 11 containing 0.5 mass percent Pd exhibits increased corrosion resistance to diluted sulfuric acid compared with Sample 2. Since diluted sulfuric acid is one of the solutions used in the slider making process, high corrosion resistance to diluted sulfuric acid facilitates the use of the diluted sulfuric acid in the slider making process.

Samples 24, 32, and 33 containing higher proportions of Pd exhibit higher corrosion resistance than that of Sample 2 not containing Pd. Among these, Sample 33 containing 17.55 mass percent Pd exhibits higher corrosion resistance than that of Sample 34 ($Fe_{70}Ni_{30}$ alloy).

As described above, the FeCoPd alloy film exhibits higher corrosion resistance than that of the FeCo alloy for the following reason. Pd is a noble metal, which is minimally ionized. When an FeNi alloy is electroplated on the FeCoPd alloy, Pd in the alloy suppresses ionization of the alloy components and thus enhances corrosion resistance.

Table 2 suggests that the addition of 0.5 mass percent Pd greatly enhances the corrosion resistance of the FeCo alloy.

Sample 11 containing 0.5 mass percent Pd has an Fe/Co (X/Y) ratio by mass percent of about 3.78 and exhibits a saturation magnetic flux density Bs of about 2.18 T, as shown in Table 1.

As described above, in Sample 11, the ratio Fe/Co (X/Y) by mass percent is within the range of 2 to 5, the saturation magnetic flux density Bs is higher than 2.0 T, and the corrosion resistance is higher than that of the Pd-free soft magnetic film. Accordingly, the lower limit of the Pd content is determined to be 0.5 mass percent.

In Table 1, the Fe/Co (X/Y) ratio by mass percent of Sample 33 containing 17.55 mass percent Pd is about 2.07. As described above, the Fe/Co ratio is in the range of 2 to 5. The Fe/Co ratio of Sample 2 is about 2 and the Pd content is the highest among the samples tested. Thus, the Fe content is the lowest, namely, about 55.55 mass percent.

Sample 33 still exhibits a saturation magnetic flux density Bs above 2.0 T regardless of the lowest Fe content. This result suggests that a saturation magnetic flux density Bs exceeding 2.0 T can be achieved at an Fe/Co (X/Y) ratio in the range of 2 to 5.

Table 2 also shows that Sample 33 containing 17.55 mass percent Pd exhibits further enhanced corrosion resistance. Based on this result, the upper limit of the Pd content is determined to be 18 mass percent in the present invention.

Based on the above experimental results, in the present invention, the ratio X/Y by mass percent of Fe to Co is in the range of 2 to 5, and the Pd content is in the range of 0.5 to 18 mass percent. A soft magnetic film comprising an alloy having such a composition exhibits a saturation magnetic flux density Bs of at least 2.0 T, and higher corrosion resistance as compared to a Pd-free FeCo alloy.

Next, the Pd content is determined when the ratio X/Y of Fe to Co by mass is in the range of 2.6 to 4.3 and when a saturation magnetic flux density Bs of at least 2.2 T is achieved.

As shown in Table 1, in Samples 15, 17, 18, 19, 20, 22, 25, 26, and 27, the ratio X/Y by mass percent of Fe to Co is in the range of 2.6 to 4.3 and the saturation magnetic flux density Bs exceeds 2.2 T. Moreover, Sample 30 exhibits a saturation magnetic flux density Bs that is slightly lower than 2.2 T. This result suggests that even an alloy containing a high Pd content of 9 mass percent exhibits a saturation magnetic flux density Bs near 2.2 T.

Accordingly, the Pd content is preferably in the range of 3 to 9 mass percent.

Based on the above experimental results, in the present invention, the preferable ratio X/Y by mass percent of Fe to Co is in the range of 2.6 to 4.3, and the preferable Pd content is in the range of 3 to 9 mass percent. A soft magnetic film comprising an alloy having such a composition exhibits a saturation magnetic flux density Bs of at least 2.2 T, and higher corrosion resistance as compared to a Pd-free FeCo alloy.

In these samples, the Pd content ranges from about 3 mass percent to about 9 mass percent.

Thus, in the present invention, the ratio X/Y of Fe to Co by mass percent ranges from 2.6 to 4.3 and the Pd content ranges from 3 mass percent to 9 mass percent. The resulting soft magnetic film has a saturation magnetic flux density Bs exceeding 2.2 T, and exhibits higher corrosion resistance as compared with a Pd-free FeCo alloy.

Other elements α (Pt, Ru, Ir) in the present invention are also noble metals having substantially the same property as that of Pd. In these elements, a saturation magnetic flux density of at least 2.0 T is achieved when the Fe/Co ratio X/Y is in the range of 2 to 5 and when the α content is in the range of 0.5 to 18 mass percent. Furthermore, a saturation magnetic flux density of at least 2.2 T is achieved when the Fe/Co ratio X/Y is in the range of 2.6 to 4.3 and when the α content is in the range of 3 to 9 mass percent. In addition, the resulting soft magnetic film would exhibit higher corrosion resistance than that of an α-free FeCo alloy.

The relationship between the composition and the saturation magnetic flux density Bs of FeCoRh soft magnetic films was also examined.

(Components in Plating Bath)
(1) FeSO$_4$.7H$_2$O: 5.0 to 25.0 g/liter (Fe ion concentration: 1.0 to 5.0 g/liter)
(2) CoSO$_4$.7H$_2$O: 0.4 to 20.0 g/liter (Co ion concentration: 0.1 to 5.0 g/liter)
(3) Rh(SO$_4$)$_3$: 0 to 48 mg/liter (Rh ion concentration: 0 to 10 mg/liter)
(4) sodium saccharine: 2 g/liter
(5) sodium chloride: 25 g/liter
(6) boric acid: 25 g/liter
(7) sodium lauryl sulfate: 0.02 ml/liter Each film was deposited under the following common conditions.

The pH value of the electrode was 1.7. Each FeCoRh alloy was formed by electroplating using a DC of 500 to 1000 mA.

After a Cu underlayer was formed on a Si substrate by sputtering, an FeCoRh or FeCo alloy layer with a thickness in the range of 0.5 μm to 1 μm was plated on the Cu underlayer in each plating bath.

The results are shown in Table 3.

TABLE 3

Composition and Saturation Magnetic Flux Density Bs

| Fe (mass %) | Co (mass %) | Rh (mass %) | Fe/Co | Bs (T) | Area |
|---|---|---|---|---|---|
| 68.64 | 28.12 | 3.23 | 2.441 | 2.29 | A |
| 10.00 | 29.17 | 0.84 | 2.400 | 2.30 | — |
| 67.87 | 25.71 | 6.42 | 2.640 | 2.28 | A |
| 69.57 | 26.02 | 4.41 | 2.674 | 2.22 | A |
| 66.84 | 29.04 | 4.12 | 2.302 | 2.31 | B |
| 65.99 | 29.75 | 4.26 | 2.218 | 2.28 | B |
| 64.01 | 31.09 | 4.90 | 2.059 | 2.31 | B |
| 68.37 | 31.63 | 0.00 | 2.162 | 2.28 | — |
| 65.65 | 31.73 | 2.62 | 2.069 | 2.29 | B |
| 69.37 | 25.31 | 5.32 | 2.741 | 2.24 | C |
| 74.81 | 25.19 | 0.00 | 2.970 | 2.27 | — |
| 73.77 | 25.60 | 0.62 | 2.882 | 2.26 | — |
| 72.06 | 26.27 | 1.67 | 2.743 | 2.18 | — |
| 67.44 | 23.78 | 8.78 | 2.836 | 2.24 | D |
| 64.03 | 27.76 | 8.21 | 2.307 | 2.26 | F |
| 63.25 | 32.07 | 4.68 | 1.972 | 2.26 | H |
| 62.25 | 31.30 | 6.45 | 1.989 | 2.21 | H |
| 64.55 | 32.96 | 2.49 | 1.958 | 2.19 | H |
| 60.74 | 32.50 | 6.76 | 1.869 | 2.27 | H |
| 76.06 | 22.46 | 1.48 | 3.386 | 2.10 | — |
| 77.67 | 20.39 | 1.94 | 3.809 | 2.15 | I |
| 72.63 | 22.52 | 4.86 | 3.225 | 2.11 | I |
| 74.16 | 23.27 | 2.57 | 3.187 | 2.11 | I |
| 69.01 | 21.11 | 9.88 | 3.269 | 2.12 | J |
| 60.28 | 20.00 | 19.72 | 3.014 | 2.13 | L |
| 64.13 | 22.66 | 13.21 | 2.830 | 2.15 | L |
| 59.31 | 29.06 | 11.63 | 2.041 | 2.17 | N |
| 58.26 | 28.64 | 13.09 | 2.034 | 2.17 | N |
| 57.47 | 29.56 | 12.97 | 1.944 | 2.14 | O |
| 56.90 | 28.85 | 14.25 | 1.972 | 2.13 | O |
| 58.91 | 35.62 | 5.47 | 1.654 | 2.17 | R |
| 58.68 | 33.83 | 7.48 | 1.735 | 2.14 | R |
| 58.42 | 37.24 | 4.34 | 1.569 | 2.17 | R |
| 62.58 | 35.29 | 2.13 | 1.773 | 2.14 | R |

Figure 11:
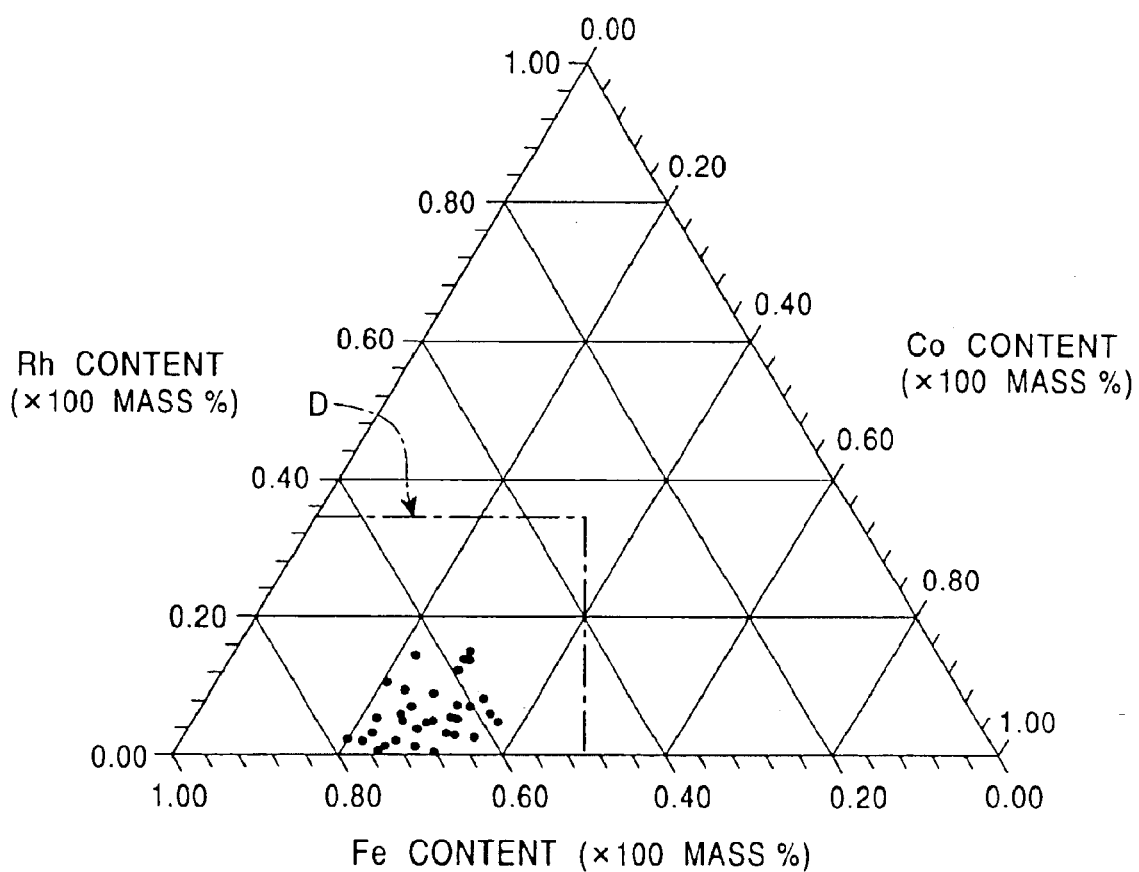
FIG. 11 is a ternary diagram illustrating the relationship between the composition and the saturation magnetic flux density of FeCoRh alloys and FeCo alloys, which are formed by electroplating.

FIG. 11 is a ternary diagram illustrating the relationship between the Fe, Co, and Rh contents, and the saturation magnetic flux density Bs that are shown in Table 3.

Figure 12:
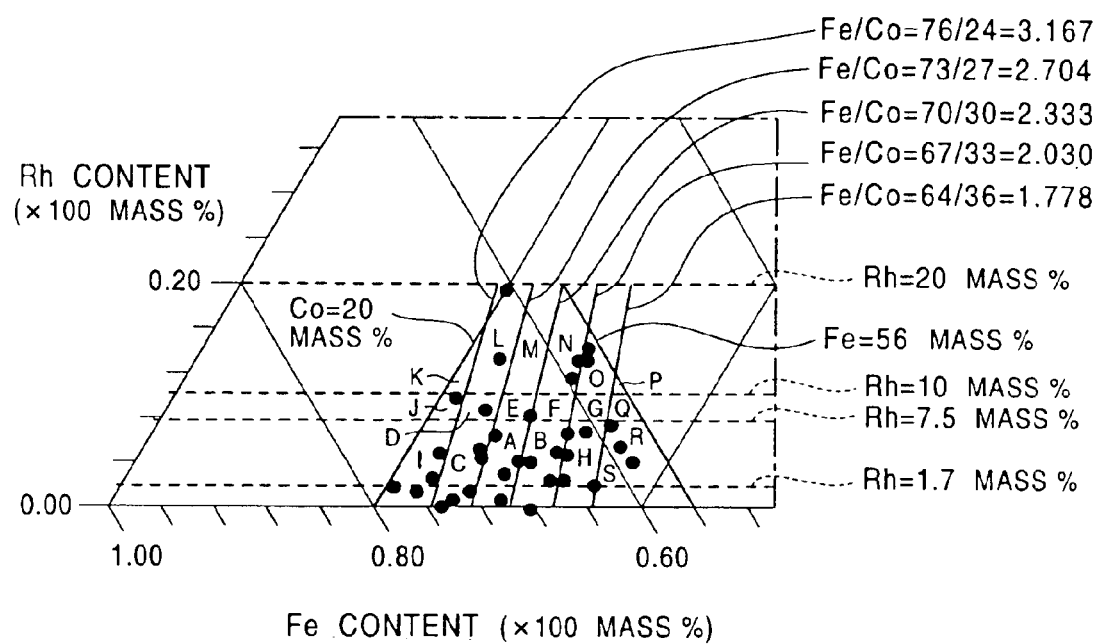
FIG. 12 is a partial enlarged ternary diagram corresponding to region D in FIG. 11.

FIG. 12 is a partial enlarged ternary diagram corresponding to Region D in FIG. 11.

The results shown in Table 3 and FIGS. 11 and 12 demonstrate that each soft magnetic film exhibits a saturation magnetic flux density Bs of at least 2.1 T, and high corrosion resistance as compared with Rh-free FeCo alloys, when the film comprises a composition which is within a region surrounded by a line corresponding to the Fe content of 56 mass percent, a line corresponding to the Co content of 20 mass percent, a line corresponding to the Rh content of 1.7 mass percent, and a line corresponding to the Rh content of 20 mass percent.

The corrosion resistance of each FeCoRh alloy was measured. In this experiment, the FeCoRh layer was formed by plating on the entire substrate surface, and the plated film was immersed into diluted sulfuric acid (pH=2), diluted sulfuric acid (pH=4), or hot pure water (60° C.) to determined the amount of etching. The results are shown in Table 4.

TABLE 4

| Composition (mass percent) | | | Amount of Etching | | | | | |
|---|---|---|---|---|---|---|---|---|
| | | | dil. H$_2$SO$_4$ (pH = 2) | | dil. H$_2$SO$_4$ (pH = 4) | | Hot Pure Water (60° C.) | |
| Fe | Co | Rh | 5 min | 30 min | 5 min | 30 min | 5 min | 30 min |
| 68.2 | 31.8 | 0.0 | 1001 | 5280 | 211 | 981 | 120 | 301 |
| 72.0 | Ni (28) | — | 583 | 3001 | — | — | — | — |
| 70.83 | 27.50 | 1.7 | 761 | 4280 | 120 | 551 | — | 221 |
| 66.16 | 31.22 | 2.6 | 539 | 2831 | 140 | 560 | — | 65 |
| 62.76 | 29.76 | 7.5 | 562 | 3269 | — | — | — | — |
| 63.11 | 26.74 | 10.2 | 489 | 2921 | — | — | — | — |
| 59.02 | 26.73 | 14.3 | 422 | 2511 | — | — | — | — |

Note:
— means "unmeasurable".

Table 4 shows that samples containing 1.7 mass percent or more of Rh exhibits reduced amounts of etching compared with the FeCo alloy film.

Based on the above experimental results, in the FeCoRh alloy according to the present invention, the Fe content is 56 mass percent or more, the Co content is 20 mass percent or more, and the Rh content is in the range of 1.7 to 20 mass percent. A soft magnetic film comprising an alloy having such a composition exhibits a saturation magnetic flux density Bs of at least 2.1 T, and a higher corrosion resistance as compared to the FeCo alloy.

Next, referring to FIGS. 1 to 4, the corrosion resistance of the lower magnetic pole layers 19 and 32, and the upper magnetic pole layers 21 and 34, which were formed by continuous plating, were examined. The lower magnetic pole layers 19 and 32 were formed of an FeCoRh alloy plated film, the gap layers 20 and 33 were formed of an NiP alloy plated film, and the upper magnetic pole layers 21 and 34 were formed of an FeCoRh alloy plated film (bottom layer) and an FeNi alloy plated film (top layer).

Each of FeCoRh alloy film samples having different compositions was immersed into diluted sulfuric acid (pH=4) or hot pure water (60° C.) to evaluate the amount of etching visually. A sample having an FeCo alloy film instead of the FeCoRh alloy film, and a sample having an FeNi alloy film instead of the FeCoRh alloy film, were also prepared and subjected to corrosion tests. The results are shown in Table 5.

TABLE 5

Etching Damage during Corrosion Test (Deposition Flame Plating)

| Composition (mass percent) | | | Visual Evaluation | | | |
|---|---|---|---|---|---|---|
| | | | dil. H$_2$SO$_4$ (pH = 4) | | Hot Pure Water (60° C.) | |
| Fe | Co (Ni) | Rh | 5 min | 30 min | 5 min | 30 min |
| 70.1 | 29.9 | 0.0 | Deposition plating was not performed due to etching. | | | |
| 72.0 | Ni (28) | — | 10 | 9 | 10 | 9 |
| 65.7 | 31.7 | 2.6 | 1 | 1 | 1 | 1 |
| 62.76 | 29.76 | 7.5 | 10 | 9 | 10 | 9 |
| 63.3 | 26.9 | 9.9 | 10 | 9 | 10 | 9 |
| 58.0 | 29.2 | 12.8 | 10 | 9 | 10 | 9 |
| 58.7 | 25.2 | 16.2 | 10 | 9 | 10 | 9 |

In the visual evaluation shown in Table 5, Rank 10 means that the soft magnetic film is not corroded (the highest corrosion resistance) whereas Rank 1 means that the soft magnetic film is almost completely corroded (the lowest corrosion resistance).

Table 5 shows that the corrosion resistance of the sample having a lower magnetic pole layer and an upper magnetic pole layer that are composed of the FeCo alloy cannot be evaluated because the FeCo alloy layer is etched and is not formed by plating.

The corrosion resistance of the sample having an FeCoRh alloy film containing 2.6 mass percent Rh is higher than that of the FeCo alloy film. However, the corrosion resistance of this FeCoRh alloy film exhibits Rank 1 in visual observation and is significantly lower than that of the NiFe alloy.

In contrast, the FeCoRh alloy films containing 7.5 mass percent or more exhibit a high corrosion resistance that is comparable with that of the FeNi alloy.

These experimental results demonstrate that the Rh content in the FeCoRh alloy film is preferably 7.5 mass percent or more in a continuous plating process.

The more preferable ranges in the present invention will now be described. In the FeCoRh alloy according to the present invention, preferably, the saturation magnetic flux density Bs is at least 2.2 T and the corrosion resistance is comparable with that of the NiFe alloy. According to Tables 3 and 5, these preferable conditions are achieved in a region surrounded by a line of the ratio X/Y by mass percent of Fe to Co of 2.030, a line of the ratio X/Y by mass percent of Fe to Co of 2.704, a line of the Rh content of 7.5 mass percent, and a line of the Rh content of 10 mass percent. Accordingly, preferable ranges of the composition of the FeCoRh alloy in the present invention are a ratio X/Y by mass percent of Fe to Co of in the range of 2.030 to 2.704 and an Rh content in the range of 7.5 to 10 mass percent.

What is claimed is:

1. A soft magnetic film having a composition represented by the formula Fe$_X$Co$_Y$α$_Z$β$_Z$ and formed by plating, wherein α is at least one element selected from the group consisting of Pd, Pt, Ru, and Ir, β is at least one of Ni and Cr,band wherein the ratio X/Y by mass percent of Fe to Co is in the range of 2 to 5, the α content Z is in the range of 0.5 to 18 mass percent, the β content V is in the range of 0.5 to 5 mass percent, and V+X+Y+Z=100 mass percent.

2. A soft magnetic film having a composition represented by the formula Fe$_X$Co$_Y$Rh$_W$ and formed by plating, wherein the Fe content X is 57 mass percent or more, the Co content Y is 20 mass percent or more, the Rh content W is 9 mass percent or more, and X+Y+W=100 mass percent.

3. The soft magnetic film according to claim 2, wherein the soft magnetic film is covered with an NiFe alloy film formed by plating.

4. The soft magnetic film according to claim 2, wherein one of an upper face and a lower face of the soft magnetic film is covered with a nonmagnetic film formed by plating.

5. A soft magnetic film having a composition represented by the formula Fe$_X$Co$_Y$Rh$_W$ and formed by plating, wherein the Fe content X is 57 mass percent or more, the Co content Y is 20 mass percent or more, the Rh content W is in the range 9 to 10 mass percent, and X+Y+W=100 mass percent, wherein the ratio X/Y by mass percent of Fe to Co is in the range of 2.030 to 2.704.

6. The soft magnetic film according to claim 3, wherein the soft magnetic film is covered with an NiFe alloy film formed by plating.

7. The soft magnetic film according to claim 3, wherein one of an upper face and a lower face of the soft magnetic film is covered with a nonmagnetic film formed by plating.

8. A soft magnetic film having a composition represented by the formula Fe$_X$Co$_Y$Rh$_W$β$_V$ and formed by plating, wherein the Fe content X is 57 mass percent or more, the Co content Y is 20 mass percent or more, the Rh content W is in the range 1.7 to 20 mass percent, β is at least one of Ni and Cr, and the β content V is in the range of 0.5 to 5 mass percent, and X+Y+W+V=100 mass percent.

9. The soft magnetic film according to claim 8, wherein the soft magnetic film is covered with an NiFe alloy film formed by plating.

10. The soft magnetic film according to claim 8, wherein one of an upper face and a lower face of the soft magnetic film is covered with a nonmagnetic film formed by plating.

11. A thin-film magnetic head comprising a magnetic lower core layer, an upper core layer formed on the magnetic lower core layer with a magnetic gap provided therebetween, a coil layer for applying a recording magnetic field to the lower core layer and the upper core layer, wherein at least one of the lower core layer and the upper core layer comprises a soft magnetic film having a composition represented by the formula Fe$_X$Co$_Y$Rh$_W$ and formed by plating, wherein the Fe content X is 57 mass percent or more, the Co content Y is 20 mass percent or more, the Rh content W is in the range of 7.5 to 20 mass percent, and X+Y+W=100 mass percent.

12. The thin-film magnetic head according to claim 11, further comprising a lower magnetic pole layer on the lower core layer and at a face opposing a recording medium, wherein the lower magnetic pole layer comprises the soft magnetic film.

13. The thin-film magnetic head according to claim 12, wherein at least one of the upper core layer and the lower core layer includes at least two magnetic sublayers at a portion adjacent to the magnetic gap, or the lower magnetic pole layer includes at least two magnetic sublayers, the magnetic sublayer being in contact with the magnetic gap comprising the soft magnetic film.

14. The thin-film magnetic head according to claim 13, wherein the magnetic sublayer not in contact with the magnetic gap is formed by plating an NiFe alloy.

15. A thin-film magnetic head comprising:

a lower core layer;

an upper core layer; and a magnetic pole unit between the lower core layer and the upper core layer, a width of the magnetic pole unit being shorter than that of the lower core layer and the upper core layer in a track width direction, the magnetic pole unit comprising: a lower magnetic pole layer in contact with the lower core layer; an upper magnetic pole layer in contact with the upper core layer; and a gap layer lying between the lower magnetic pole layer and the upper magnetic pole layer, or comprising: an upper magnetic pole layer in contact with the upper core layer and a gap layer lying between the upper magnetic pole layer and the lower core layer, wherein at least one of the upper magnetic pole layer and the lower magnetic pole layer comprises a soft magnetic film having a composition represented by the formula $Fe_XCo_YRh_W$ and formed by plating, wherein the Fe content X is 57 mass percent or more, the Co content Y is 20 mass percent or more, the Rh content W is 9 mass percent or more, and X+Y+W=100 mass percent.

16. The thin-film magnetic head according to claim 14, wherein the upper magnetic pole layer comprises the soft magnetic film and the upper core layer comprises an NiFe alloy film formed by plating.

17. The thin-film magnetic head according to claim 14, wherein at least one of the upper core layer and the lower core layer includes at least two magnetic sublayers at a portion adjacent to the gap layer, or at least one of the lower magnetic pole layer and the upper magnetic pole layer includes at least two magnetic sublayers, the magnetic sublayer being in contact with the gap layer comprising the soft magnetic film.

18. The thin-film magnetic head according to claim 17, wherein the magnetic sublayer not in contact with the gap layer is formed by plating an NiFe alloy.

* * * * *

UNITED STATES PATENT AND TRADEMARK OFFICE
CERTIFICATE OF CORRECTION

| | | |
|---|---|---|
| PATENT NO. | : 7,095,586 B2 | Page 1 of 1 |
| APPLICATION NO. | : 10/183199 | |
| DATED | : August 22, 2006 | |
| INVENTOR(S) | : Mitsuhiro Gotoh et al. | |

It is certified that error appears in the above-identified patent and that said Letters Patent is hereby corrected as shown below:

On the Title Page

In column 1, (item 54), before "OF AT LEAST 2.0 T" DELETE "BS" and substitute --Bs-- in its place.

In the Specification

In column 1, in the title, before "OF AT LEAST 2.0 T" DELETE "BS" and substitute --Bs-- in its place.

In the Claims

Column 26, in claim 1, line 8, before "and formed by" delete "$B_z$" and substitute --$B_V$-- in its place.

Signed and Sealed this

Second Day of January, 2007

JON W. DUDAS
*Director of the United States Patent and Trademark Office*